(12) United States Patent
Farjady et al.

(10) Patent No.: US 6,339,664 B1
(45) Date of Patent: Jan. 15, 2002

(54) WAVELENGTH DIVISION MULTIPLEXING

(75) Inventors: Farshid Farjady, Corning, NY (US); Michael Charles Parker, Sutton (GB)

(73) Assignee: British Technology Group InterCorporate Licensing Limited, London (GB)

( * ) Notice: Subject to any disclaimer, the term of this patent is extended or adjusted under 35 U.S.C. 154(b) by 0 days.

(21) Appl. No.: 09/632,906

(22) Filed: Aug. 4, 2000

Related U.S. Application Data

(63) Continuation of application No. PCT/GB99/00531, filed on Feb. 19, 1999.

(30) Foreign Application Priority Data

Feb. 20, 1998 (GB) .............................................. 9803725

(51) Int. Cl.$^7$ ................................................ G02B 6/34
(52) U.S. Cl. .............................. 385/37; 385/46; 385/24
(58) Field of Search ............................. 385/14, 24, 37, 385/46

(56) References Cited

U.S. PATENT DOCUMENTS

| | | | |
|---|---|---|---|
| 5,002,350 A | | 3/1991 | Dragone |
| 5,351,317 A | | 9/1994 | Weber |
| 5,367,586 A | * | 11/1994 | Glance et al. |
| 5,412,744 A | | 5/1995 | Dragone |
| 5,515,460 A | * | 5/1996 | Stone |
| 5,745,612 A | * | 4/1998 | Wang et al. |
| 5,862,279 A | * | 1/1999 | Amersfoort et al. |

FOREIGN PATENT DOCUMENTS

| | | |
|---|---|---|
| EP | A-762163 | 12/1996 |
| JP | A-5-323246 | 12/1993 |
| WO | WO 95 22070 A | 8/1995 |
| WO | WO 95/22070 * | 8/1995 |
| WO | WO 99 45420 A | 9/1999 |

OTHER PUBLICATIONS

Farjady F.,Parker MC, Walker SD: "Non–linear phase apodisation techniques for arrayed–waveguide grating passband control" IEEE Colloquium on Multiwavelength optical Networks: Devices, Systems, 17$^{th}$ Jun. 1998, pp. 9/1–9/5, XP000783512.

M R Amersfoort et al, Electronics Letters, vol. 32, pp. 449 to 451 (1996), "Passband broadening of integrated arrayed waveguide filters using multimode interference couplers".

Y P Ho et al, IEEE Photonic. Tech. Lett. vol. 9, pp. 342 to 344 (1997), disclose a device having multiple Rowland circles on the output side.

A Rigny et al, Proceedings 23$^{rd}$ ECOC Edinburgh UK, pp. 79 to 82 (Sep. 1997) in IEE Conference Publication No. 448, disclose a device having two interleaved sets of channels, each set having a different optical path difference increment.

D Trouchet et al, OFC '97 Technical Digest, pp. 302, 303.

* cited by examiner

Primary Examiner—Hung N. Ngo
(74) Attorney, Agent, or Firm—Nixon & Vanderhye

(57) ABSTRACT

An arrayed wavelength grating device has a series of waveguiding channels (3) interconnecting two free space regions (2,4) across which light inputting and outputting the device passes. There are differences in optical path length between any two of said channels (3) lying adjacent to one other in said series, which differences are defined by respective optical path length increments. The optical path length progression across said channels (3) is non-linear, not being defined by any one value of the path length increments, nor by a plural number of values of the path length increments each defining a linear optical path length progression of a subset of at least three of said channels (3).

57 Claims, 18 Drawing Sheets

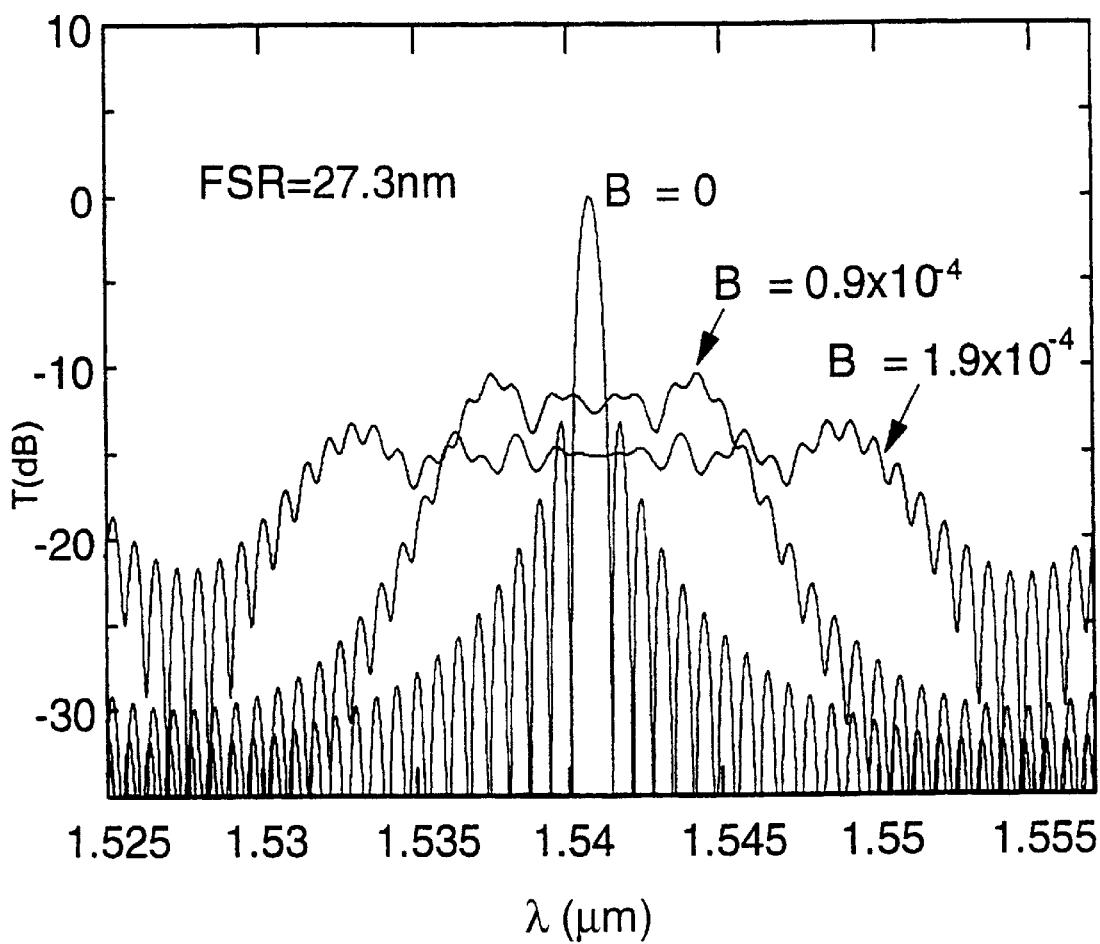

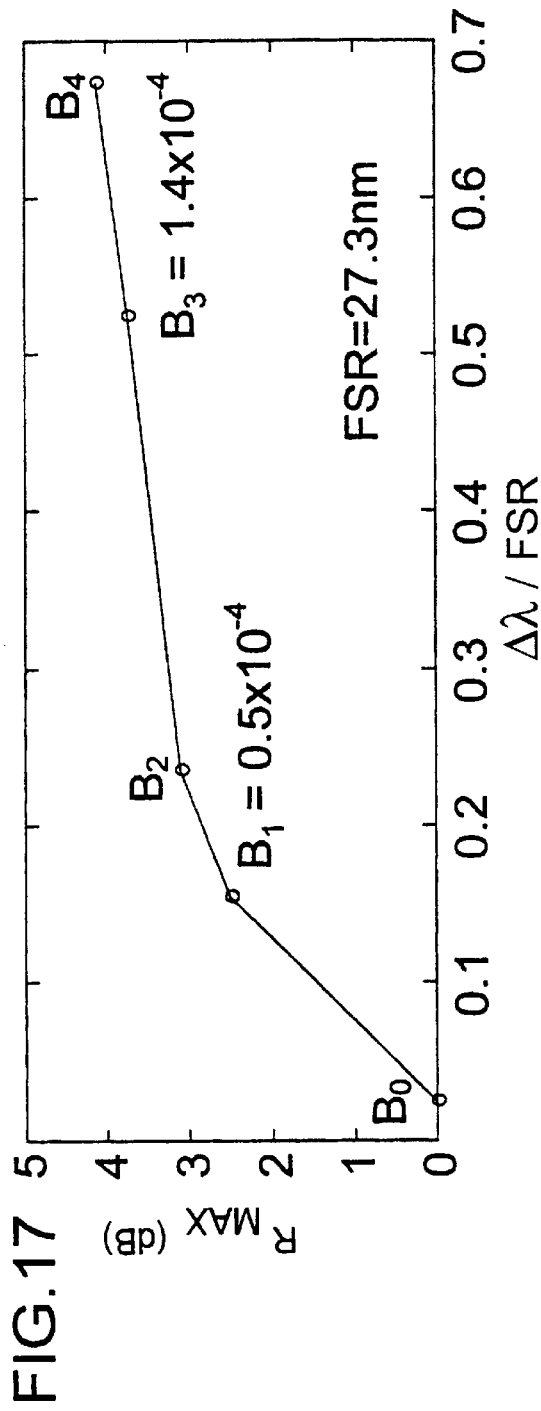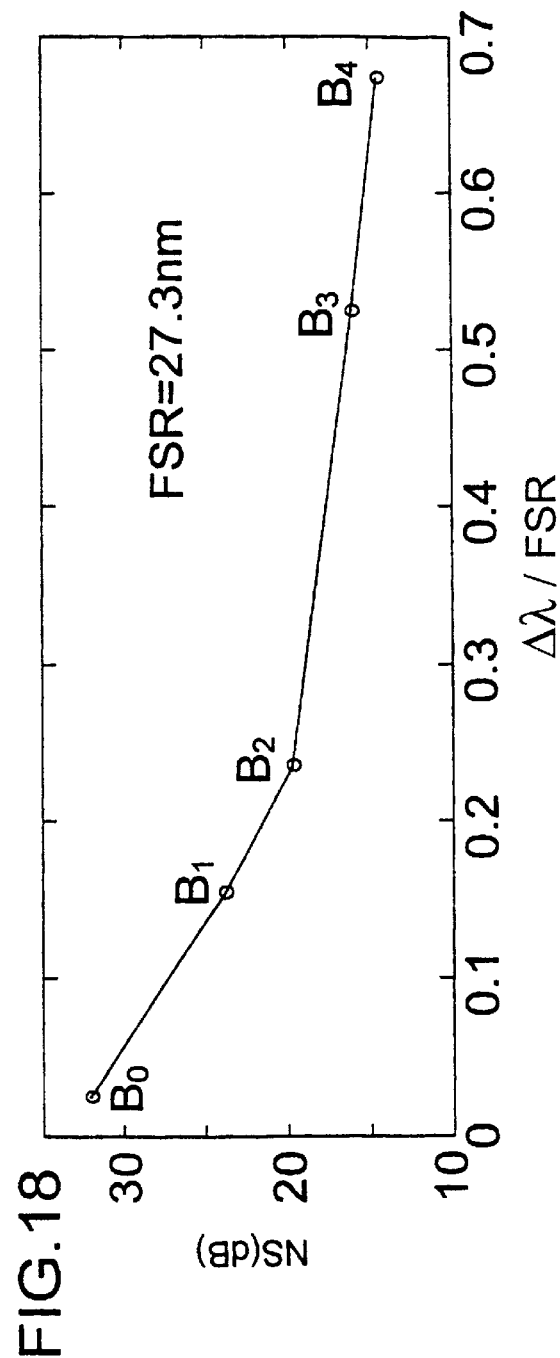

WAVELENGTH DIVISION MULTIPLEXING

This application is a continuation of PCT/GB99/00531 filed Feb. 19, 1999.

The invention lies in the field of wavelength division multiplexing and relates to the design of arrayed waveguide gratings.

For networks employing wavelength division multiplexing (WDM), for example passive optical networks (PONs), there is a requirement for components for use as wavelength selective multiplexers, demultiplexers and routers. Examples of such components are fibre Fabry-Perot filters, in-line fibre Bragg gratings, free-space diffraction gratings, cascaded filters and arrayed waveguide gratings, the last-mentioned of which components being the subject of the present invention.

An arrayed waveguide grating (AWG) is often referred to as a waveguide grating router (WGR), and sometimes as a phased array (PHASAR) or phased array waveguide grating (PAWG).

As described in U.S. Pat. No. 5,002,350, an AWG can be considered to be made up of two star couplers, one on the input side and one on the output side of the AWG, which are interconnected by an array of M waveguiding channels, in sequence m=1 to M with the channels having gradually increasing optical path lengths such that the optical path length of the mth channel is greater than that of the (m−1)th channel by a fixed increment $\Delta l$.

AWGs have been manufactured from doped silica films deposited on silicon substrates and using indium-phosphide-based technology.

Some AWGs have an optical path length increment $\Delta l$ between adjacent channels, or grating arms, which cannot be changed in use, this kind of AWG being referred to as passive in the following. An example of a passive AWG is to be found in U.S. Pat. No. 5,002,350.

U.S. Pat. No. 5,515,460 discloses another kind of AWG which allows the size of the optical path length increment $\Delta l$ to be varied in use, this kind of AWG being referred to as active in the following. In the design of the AWG of U.S. Pat. No. 5,515,460, the optical path lengths are varied through the application of an electrical current signal I, i.e. $\Delta l=f(I)$, so that the device can be tuned by varying the current of the applied control signal.

In standard AWGs, passive and active, the shape of the passband of the channels is approximately sinc squared, being a multiple convolution of the input and output waveguide modes with the echelon transfer function produced by the waveguide array. In consequence, the wavelength shift tolerance is minimal. That is, if the input wavelength varies unintentionally by a small amount, this is likely to cause an unintended change in the output port to which the input signal is routed, or at least a loss in the signal power coupled into the intended output port.

A number of ways of broadening the passband of an AWG to overcome this problem are known from the following documents:

(1) M. R. Amersfoort et al, Electronics Letters, volume 23, pages 449 to 451 (1996), disclose a device having multimode interference couplers.

(2) Y. P. Ho et al, IEEE Photonic. Tech. Lett. volume 9, pages 342 to 344 (1997), disclose a device having multiple Rowland circles on the output side.

(3) A. Rigny et al, Proceedings 23rd ECOC Edinburgh UK, pages 79 to 82 (September 1997) in IEE Conference Publication No. 448, disclose a device having two interleaved sets of channels, each set having a different optical path difference increment.

(4) U.S. Pat. No. 5,412,744 (Dragone) discloses a double waveguide input in the form of a Y-branch.

(5) D. Trouchet et al, OFC '97 Technical Digest, pages 302 and 303 discloses a device in which the input and output star couplers have two focal points.

According to first aspects of the invention, exemplified by claims 1 to 29 of the attached claims, there are provided arrayed waveguide gratings in which the channels have a non-linear optical path difference progression.

It will thus be appreciated that the present design is fundamentally different from that of conventional AWGs in which the optical path lengths of the channels increase in equal steps with channel number, thus to provide a linear phase profile considered to be an essential technical requirement in conventional AWGs. By contrast, in the present design, the optical path length increment between channels is a function of channel number, i.e. the optical path lengths of the channels progress in non-equal steps with channel number, thus to provide a non-linear phase profile. The non-equal optical path length increment between channels can be thought of as comprising a component of equal path length increments, as in a conventional AWG, in combination with an additional component of path length increments which, in the preferred embodiments, is a super-linear polynomial function. It is this additional component which is the source of the non-linear attributes of the phase profile.

It will be understood that the increment need not be positive, but may also be negative, i.e. a decrement and the use of the word increment when describing the claimed invention and its embodiments should be understood as having this meaning.

In some embodiments the additional component of path length increments follows a parabolic function and thus results in the non-linear phase profile being a parabolic profile, i.e. of order 2.

In other embodiments the non-linear phase profile is super- or sub-parabolic. In one specific example, it is found that a super-parabolic, non-linear profile of order 2.1 provides optimum performance.

Generally, the non-linear profile may contain higher even, and/or odd, order expansion terms, since in general a function can be expanded in terms of even, and/or, odd powers.

It is through the departure from the linear phase profile of conventional AWGs that passband broadening can be achieved without requiring any additional elements and without adding complexity to the waveguiding structure and thus the fabrication.

Optical path length can be varied by varying the geometrical channel length and/or by varying the refractive index along the channels.

According to second aspects of the invention, exemplified by claim 30 to 41 of the attached claims, there are provided arrayed waveguide gratings in which the passband is tailored by amplitude modulation of the channel transmission, for example by channel-dependent attenuation or gain within the channels, or via incorporation of a channel-dependence of the coupling coefficients for coupling into or out of the channels.

For a better understanding of the invention, and to show how the same may be carried into effect, reference will now be made, by way of example, to the accompanying drawings, in which:

FIG. 16 shows the passband broadening for an example of the fourth embodiment as a plot of transmission T in dB versus wavelength λ in μm;

FIG. 17 shows the variation in maximum ripple $R_{MAX}$ in dB versus normalised passband width Δλ/FSR for a free spectral range of FSR=27.3 nm for the example of the fourth embodiment;

FIG. 18 shows the variation in out-of-band noise suppression (i.e. signal-to-noise ratio) NS in dB versus normalised passband width Δλ/FSR for a free spectral range of FSR= 27.3 nm for the example of the fourth embodiment;

Figure 1:
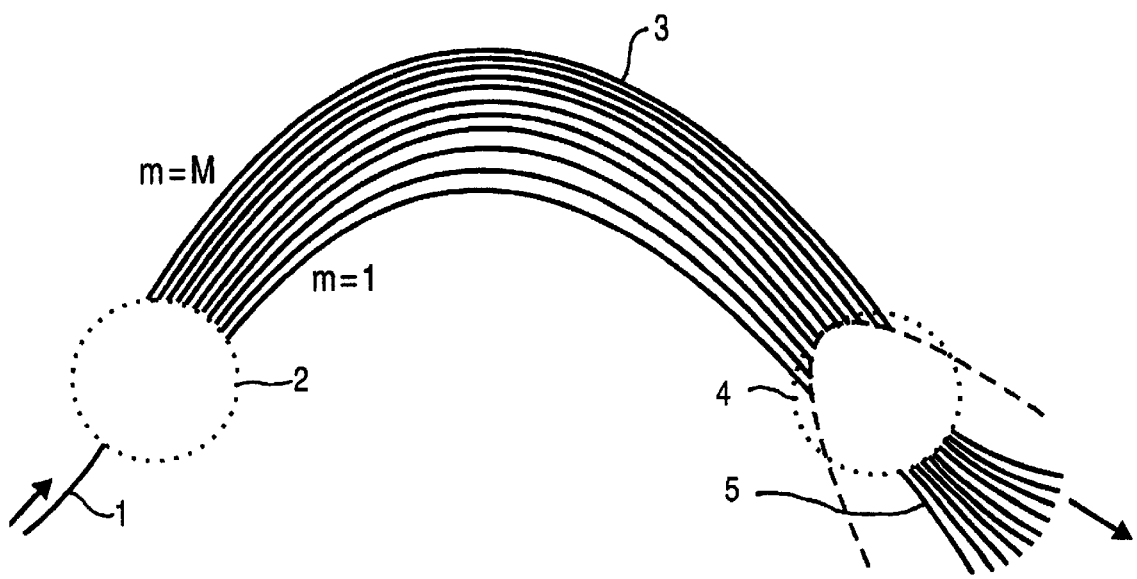
FIG. 1 is a schematic diagram of an AWG according to first and second embodiments of the invention.

FIG. 1 is a schematic diagram of an AWG according to first and second embodiments of the invention. The general form of the AWG is similar to that of a conventional AWG. The AWG comprises one input channel 1 having an end aperture positioned on an arc forming one rim of an input-side free-space region 2 which is shown schematically in FIG. 1 with a dotted line to indicate the circumference of the Rowland circle. A plurality of waveguides 3, numbered in sequence 1 to M with m denoting an mth one of the M waveguides 3, have respective end apertures positioned on a further arc of the input-side free-space region 2 facing the first-mentioned arc and arranged to receive light components from the input channel 1 after propagation through the free-space region 2. The channels 3 extend to terminate at respective other apertures on an edge of an output-side free-space region 4. Conventionally, the edge on which the apertures of the channels 3 lie is an arc of a circle, the grating circle, as indicated by the dotted line of the Rowland circle which is a circle having a diameter equal to the radius of the grating circle. However this is not the case in the first and second embodiments in which the edge does not follow the arc of a circle, i.e. is non-arcuate, as indicated by the dashed line. The profile of this edge, and how it may be designed, will be described in more detail in the following with the aid of a theoretical analysis. Finally, a plurality of output channels 5 are arranged with respective apertures positioned on an arc of the output-side free-space region 4, as in a conventional AWG.

It will be understood that the AWG of FIG. 1 may be modified so as to include a plurality of input channels 1, as is known. Moreover, it will be appreciated that the same effect as provided by any given non-arcuate profile of channel apertures at the output-side free space region 4 can be provided by instead making an analogous, non-arcuate arrangement of channel apertures at the input-side free-space region 2. Similarly, both aperture profiles may be non-arcuate to provide the same effect.

A theoretical description applicable to AWGs with non-linear phase profiles according to the first and second embodiments is now developed.

The basic equation describing the output amplitude spectrum t(λ) from one output port, after phase apodisation, is given by:

$$t(\lambda) = \sum_{m=1}^{M} f_m f'_m \exp[j(2\pi n \Delta l / \lambda)\alpha] \tag{1}$$

and $$\alpha = m + \phi$$

where φ is a function of m and is a general phase deviation profile, in this case being given by $$\phi = B[\mathrm{mod}(m - M/2)]^P \tag{1a}$$

where
  λ is the wavelength,
  $f_m$, $f_m'$ are the coupling coefficients for the mth waveguide at the fan-in and fan-out respectively,
  n is the refractive index,
  Δl is a constant representing the standard incremental path length difference between waveguides of a conventional AWG of the same FSR,
  M the total number of channels of the array, and
  P an exponent determining the shape of the phase profile.

At this point, it is noted that equation (1) reduces to that for a conventional passive AWG if α=m, i.e. B=0, and that for a conventional active AWG if α=m+Bm, where B is a function of an electrical control signal.

The exponent P in equation (1a) determines the deviation of the phase profile from a linear one across the M waveguides such that P=2 corresponds to a parabolic phase profile whilst P<2 and P>2 indicate sub- and super-parabolic profiles respectively. The modulus in equation (1) ensures that the phase profile remains both real and symmetrical about the centre one of the waveguides. The coefficient B is a measure of the amount of the parabolic, or other order, deviation from the Rowland circle at the fan-out section of the AWG. To achieve a broadened spectrum of 3 dB-width $\Delta\lambda$ the required value for B is closely approximated by:

$$B = \frac{2(\Delta\lambda - \Delta\lambda_0)}{\pi(Mn\Delta l/\lambda_0)^{P/2} FSR} \quad (2)$$

where $\Delta\lambda_0 = \lambda_0^2/Mn\Delta l$ the passband 3 dB-width for the unbroadened (i.e. unmodified) AWG, $\lambda_0$ is the centre wavelength of the passband, FSR is the free spectral range, and $n\Delta l/\lambda_0$ is the AWG grating order.

A first embodiment of the invention will now be described with reference to FIGS. 2 to 5. The first embodiment has a parabolic deviation from an arcuate profile of the apertures of the channels 3 at the output-side free-space region 4, as described by setting P=2 in the above-mentioned theoretical description. The profile of the apertures of the channels 3 at the input-side free-space region 2 remains arcuate.

Figure 2:
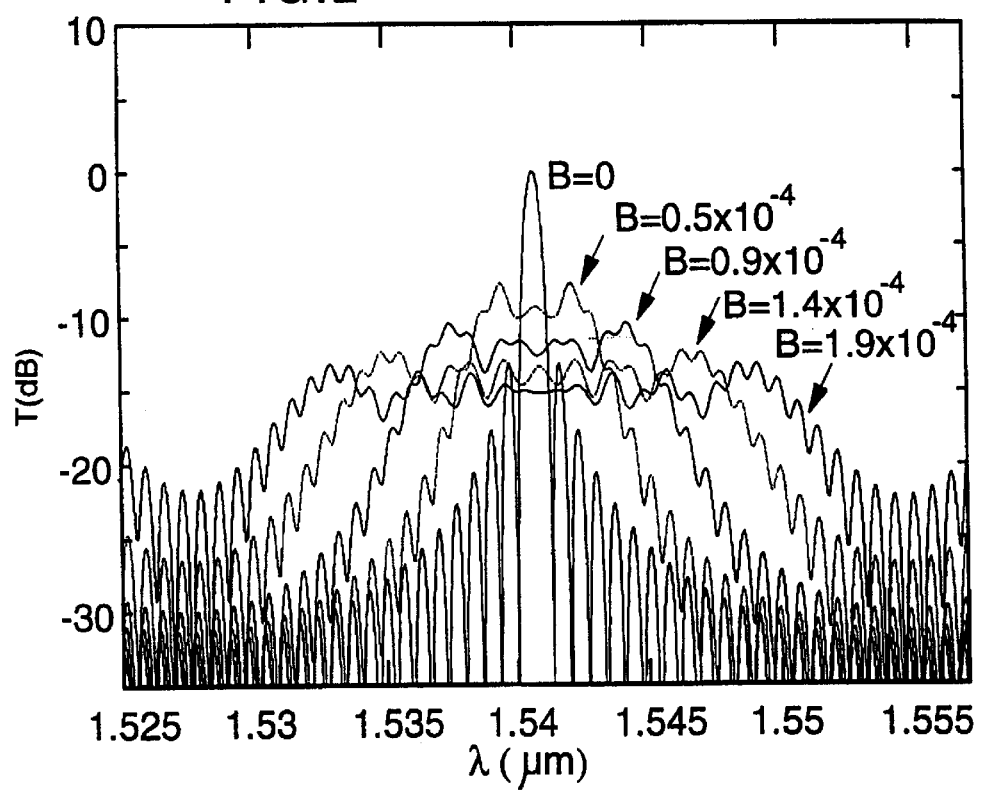
FIGS. 2 and 3 show the passband characteristics of an AWG according to the first embodiment of the invention having an output star coupler displaying a parabolic, i.e. order 2, deviation from the Rowland circle.

FIG. 2 shows the passband characteristics of an AWG of the first embodiment for various levels B of parabolic deviation from the conventional Rowland circle configuration. The plot is of wavelength $\lambda$ versus transmission T in dB. For comparison, the passband characteristic for B=0, i.e. the conventional arcuate aperture profile, is also shown. The transmission is normalised to the standard AWG response, i.e. the response at B=0. The other parameter values for the example of FIG. 2 are M=40, $\Delta l$=40$\mu$m, n=2.2 and FSR=27 nm. The analysis is based on Fresnel diffraction theory, as is applicable to a Fourier optical device. As the passband is increased from its B=0 value of 0.67 nm to 15.1 nm the variance remains low, having a maximum ripple of 4.1 dB, variance being a measure of the deviation of the transmission from its average value over the passband.

Figure 3:
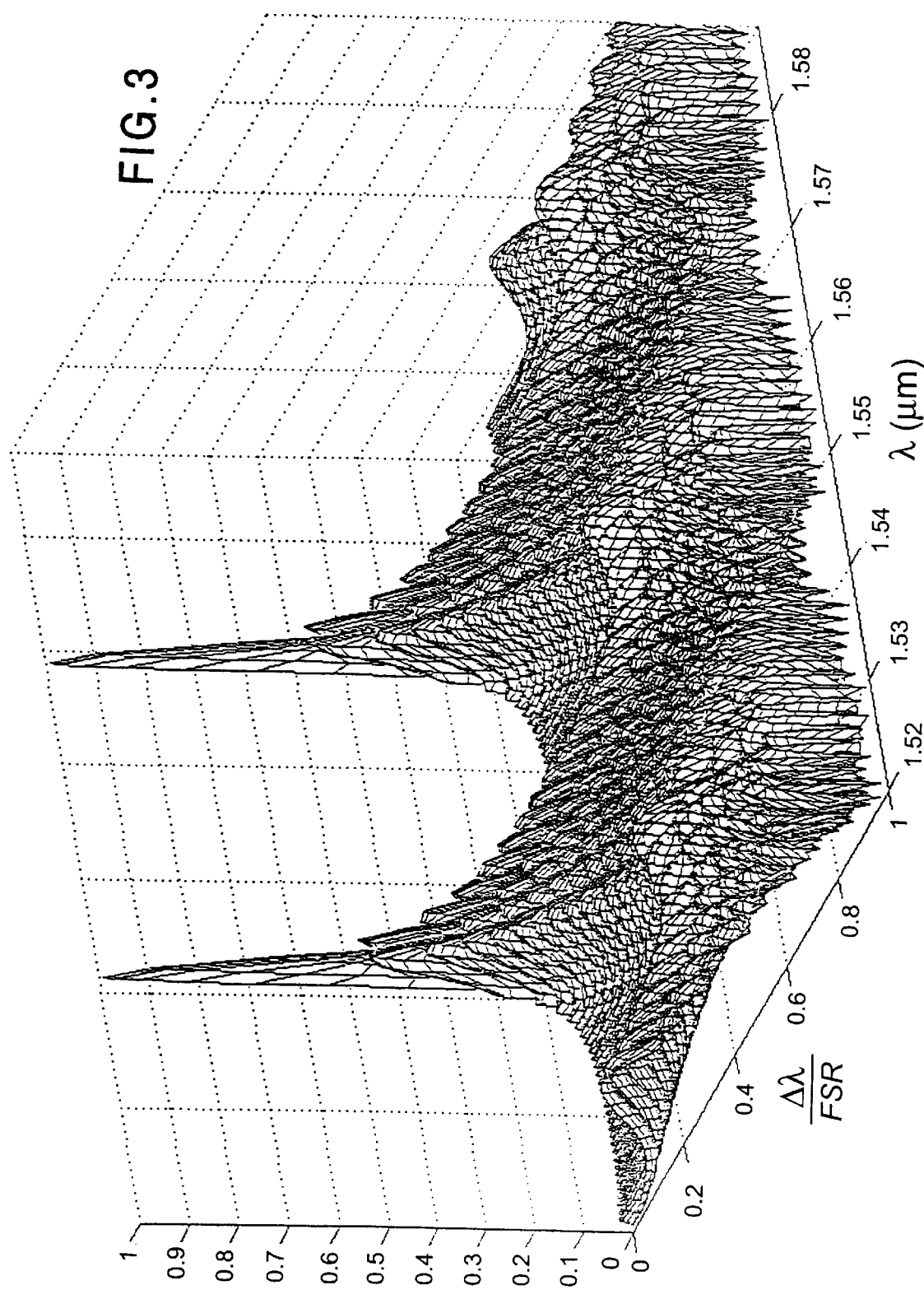

FIG. 3 is a further plot of the same example as FIG. 2. As in FIG. 2, wavelength $\lambda$ is plotted against transmission T, albeit with the transmission being plotted on a linear scale in FIG. 3. The additional information shown in FIG. 3 is the normalised passband $\Delta\lambda$/FSR, which is shown in a third dimension.

Figure 4:
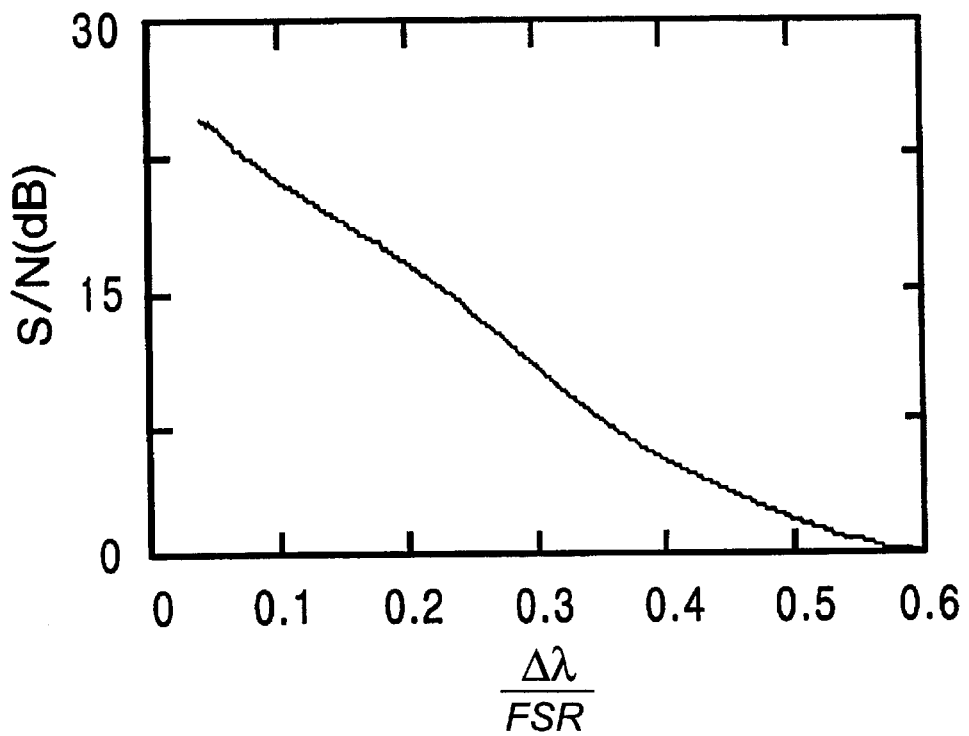
FIG. 4 shows the reduction in out-of-band signal suppression, in terms of the average signal-to-noise ratio S/N, as the passband width Δλ, shown normalised to the free spectral range FSR, is increased.

FIG. 4 shows the out-of-band signal suppression, in terms of signal-to-noise ratio S/N, as a function of normalised passband width $\Delta\lambda$/FSR. With increasing parabolic deviation, the out-of-band signal suppression reduces. In this example, the S/N reduces from a 32 dB for the narrow passband limit to a value of 0 dB at a passband $\Delta\lambda$ of 0.56 times the free spectral range FSR, with an FSR of 27 nm, i.e. $\Delta\lambda$=15.1 nm.

Figure 5:
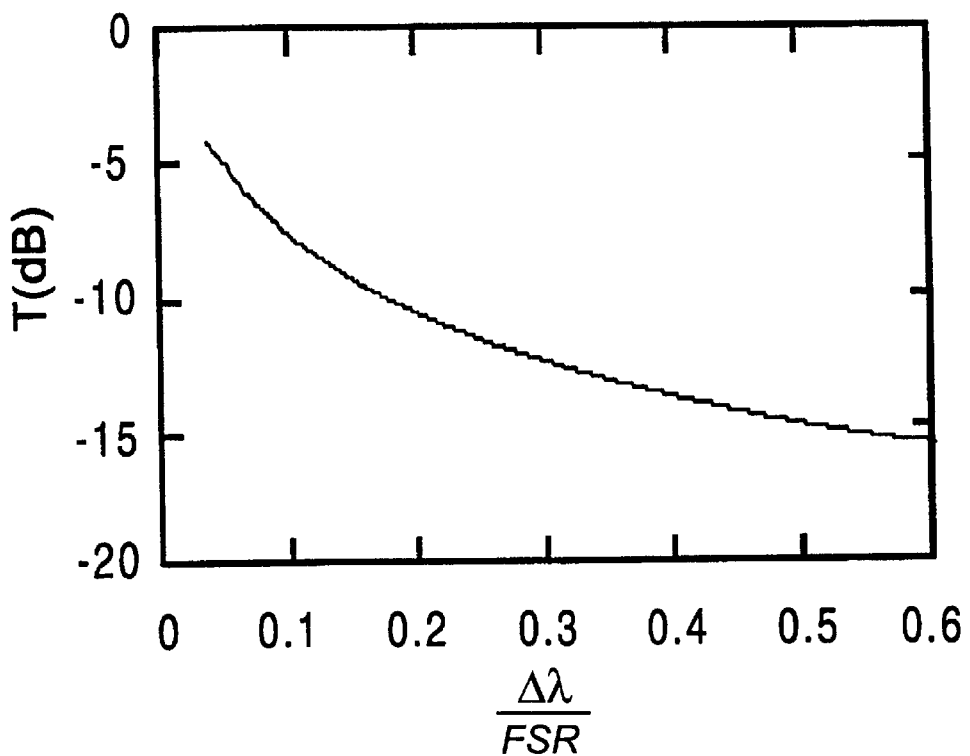
FIG. 5 shows the reduction in average device power transmission T as the passband width Δλ, shown normalised to the free spectral range FSR, is increased.

FIG. 5 shows power transmission T through the AWG, averaged over the AWG passband, as a function of passband width $\Delta\lambda$. As can be expected from basic-energy conservation principles, the transmission falls as the degree of passband broadening increases. In this example, the fall is 11.5 dB from the narrow passband limit to a passband $\Delta\lambda$ of 0.56 times the free spectral range FSR, with an FSR of 27 nm. The reduction in transmission is the penalty paid for the broadened, flattened response.

A second embodiment of the invention is now described with reference to FIG. 6.

The second embodiment is the same as the first embodiment except in respect of the non-linear phase profile which is super-parabolic, having an order value P of 2.1.

Figure 6:
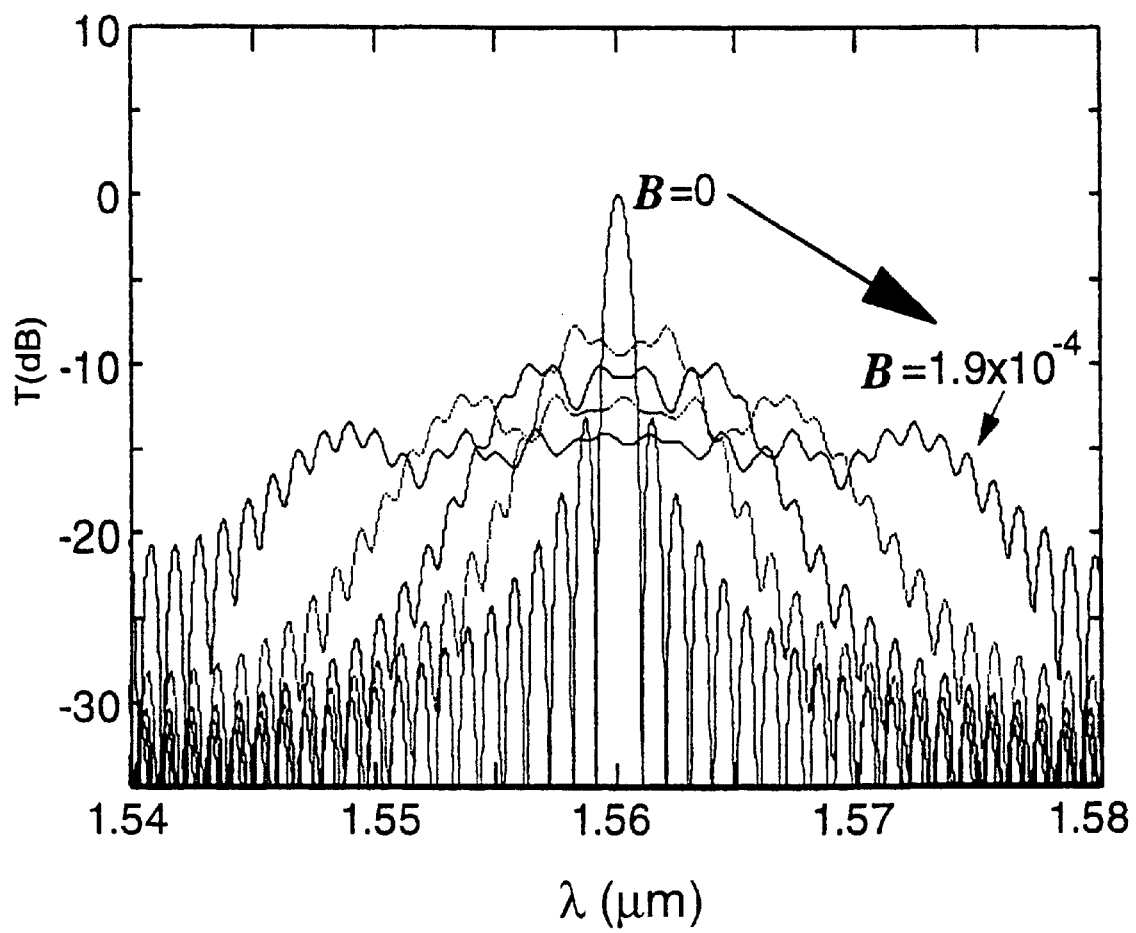
FIG. 6 shows the passband characteristics of an AWG according to the second embodiment of the invention having an output star coupler displaying a super-parabolic, order 2.1, deviation from the Rowland circle.

FIG. 6 corresponds to FIG. 2 and shows the passband characteristics of an AWG of the second embodiment for various levels B of super-parabolic deviation from the conventional Rowland circle configuration. The other parameter values for the example of FIG. 6 are the same as for that of FIG. 2, i.e. M=40, $\Delta l$=27 $\mu$m, n=2.2 and FSR=40 nm. As the level of B increases from 0 to $1.9 \times 10^4$, the passband broadens from 0.7 nm to 28 nm.

Figure 7:
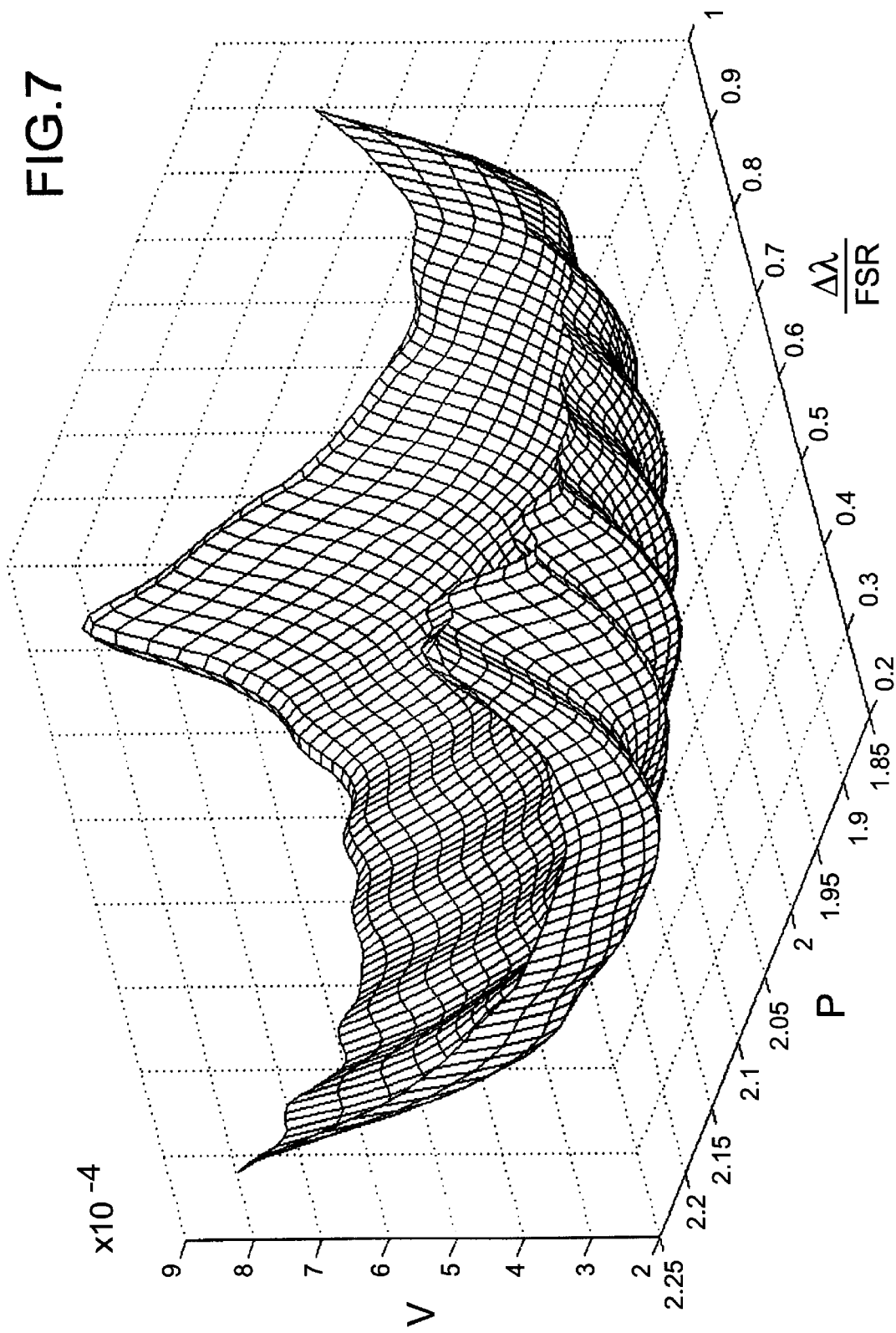
FIG. 7 shows the passband characteristics of AWGs having an output star coupler displaying sub- and super-parabolic deviations from the Rowland circle of order P=1.85 to 2.25, the characteristics being plotted in terms of order P, normalised passband width Δλ/FSR and normalised passband variance V (i.e. ripple)

FIG. 7 illustrates the passband variance (i.e. ripple) as a function of P and $\Delta\lambda$. The exponent P is varied over sub- and super-parabolic values in the range 1.85 to 2.25. The passband variance is smallest at P=2.1 over the range $\Delta\lambda$/FSR 0.4 to 0.8, hence the choice of this value of P in the second embodiment.

Figure 8:
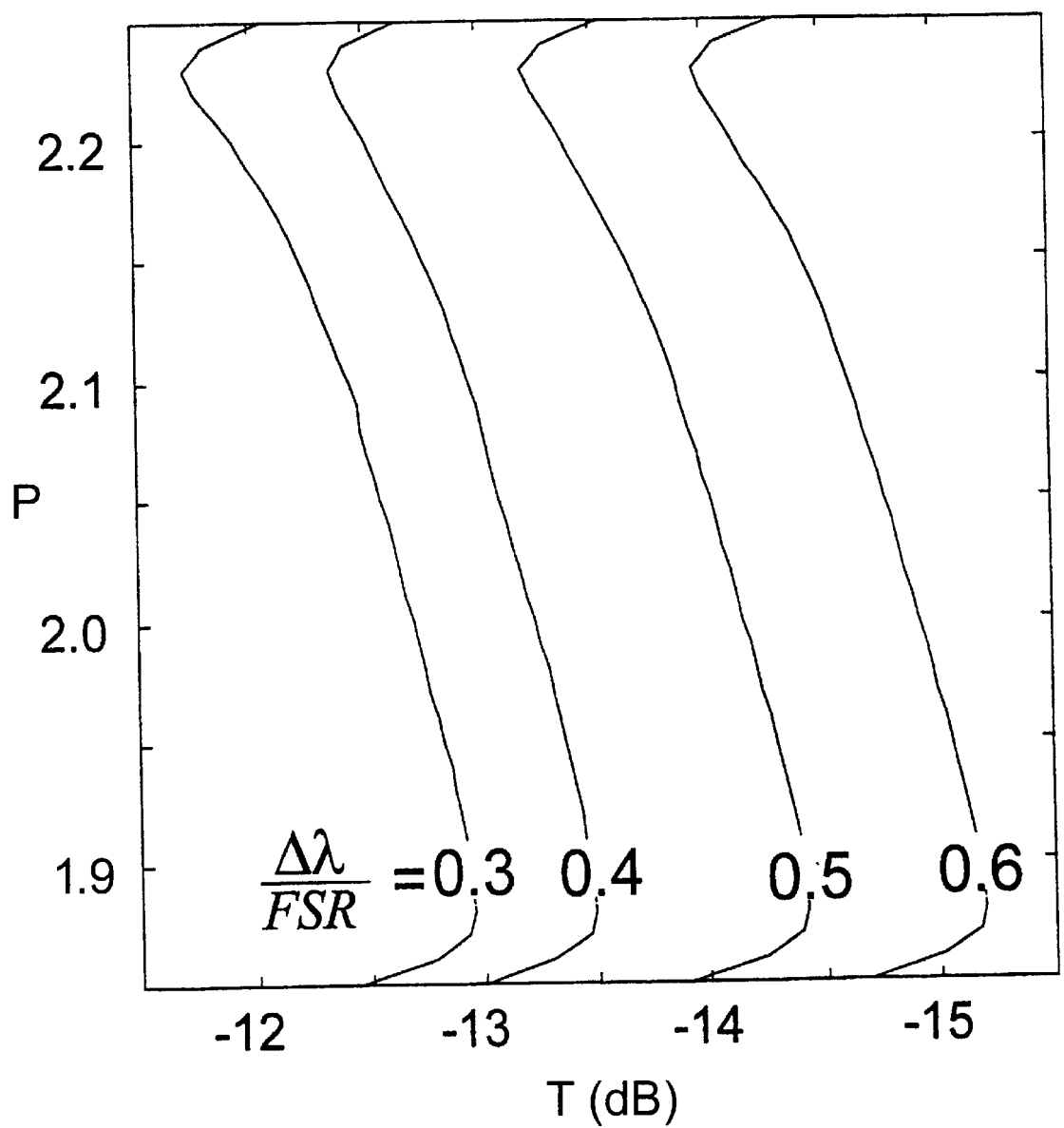
FIG. 8 shows the average passband transmission T as a function of order P for various values of normalised passband width Δλ/FSR.

FIG. 8 shows the average passband transmission T in dB as a function of the exponent P over the same range as FIG. 7, each curve being for a specific value of the normalised passband width $\Delta\lambda$/FSR. This plot shows that the transmission efficiency increases as P increases from P=1.9 to 2.2. Thus, with reference also to FIG. 7, it can be seen that P=2.2 provides better transmission either than P=2.1 or P=2.0, but at the cost of increased variance or ripple.

As an alternative to deviation from a grating circle configuration of the placement of the apertures of the channels 3 around one or both of the free space regions, the same optical path length progressions can be realised in some cases by choice of the routing of the channels themselves over the planar structure of the AWG, the channel apertures being placed on the grating circle in the conventional manner.

A third embodiment of the invention is now described with reference to FIG. 9.

The general form of the AWG is similar to that of a conventional AWG and that shown in FIG. 1. Namely, the AWG comprises an input channel 1, but may comprise multiple input channels, an input-side free-space region 2, a plurality of waveguides 3, numbered in sequence 1 to M with m denoting an mth one of the M waveguides 3, an output-side free-space region 4 and a plurality of output channels 5. As in a conventional AWG, the edge on which the apertures of the channels 3 lie is an arc, both at the input-side and the output-side free-space regions 4 and 5, as indicated by the dotted lines of the respective Rowland circles.

The AWG of the third embodiment differs from a conventional AWG by virtue of the phase control means 6 arranged to act on respective portions of the lengths of the waveguide channels 1 to M to impress a phase shift of a desired functional form across a wavefront propagating collectively through the channels 1 to M.

The phase control means 6 may for example be a layer of hydrogenated amorphous silicon ($\alpha$-Si:H) for an AWG based on silicon technology. Alternatively, the phase control means 6 may be embodied either in an AWG based on indium phosphide or lithium niobate technology, for example in the form of an electrode.

In the following it will be assumed that the phase shift impressed on a given channel will be proportional to the length of the channel segment over which the phase control means 6 extends for the channel concerned.

Figure 9:
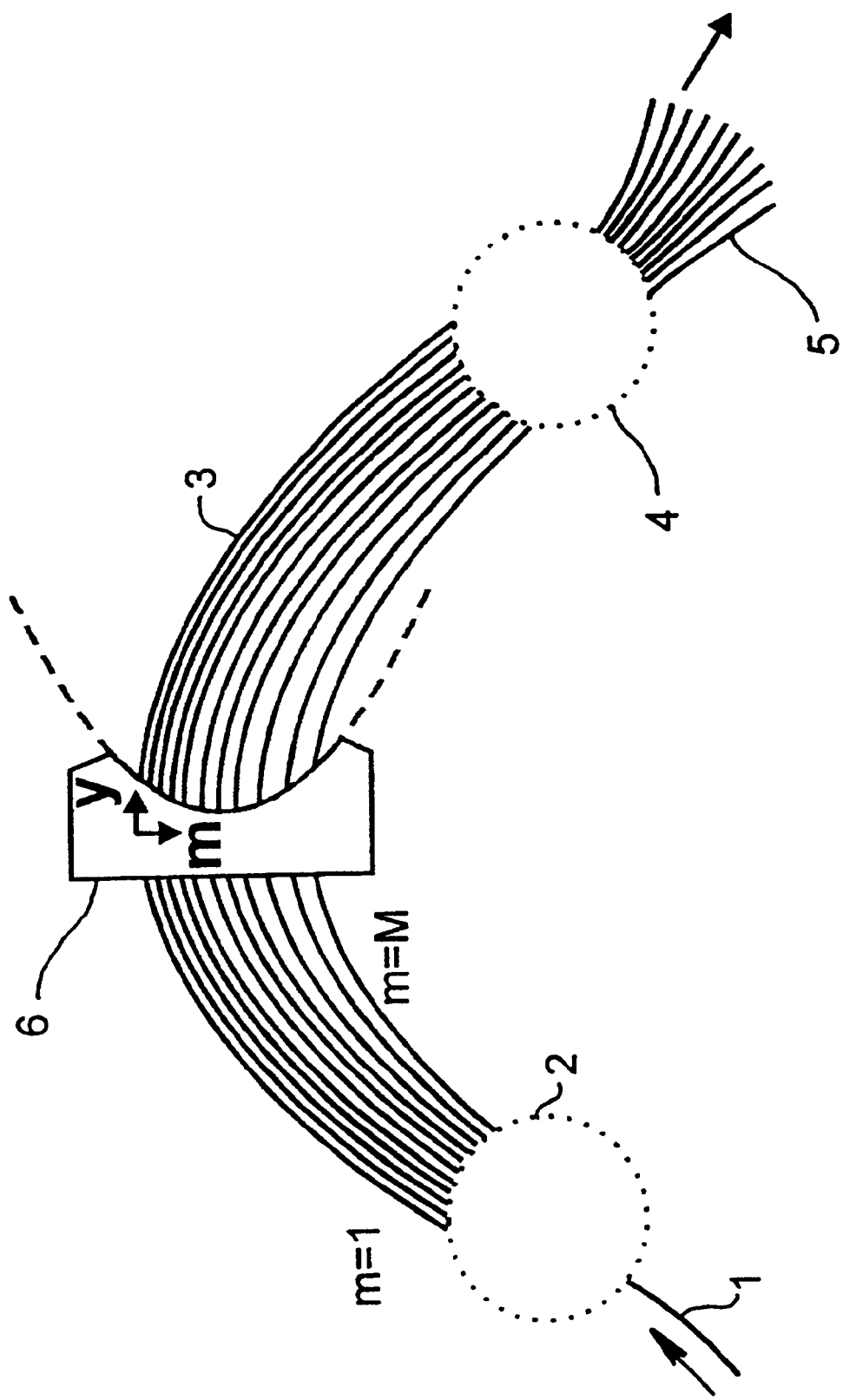
FIG. 9 is a schematic diagram of an AWG according to a third embodiment of the invention.
Figure 10:
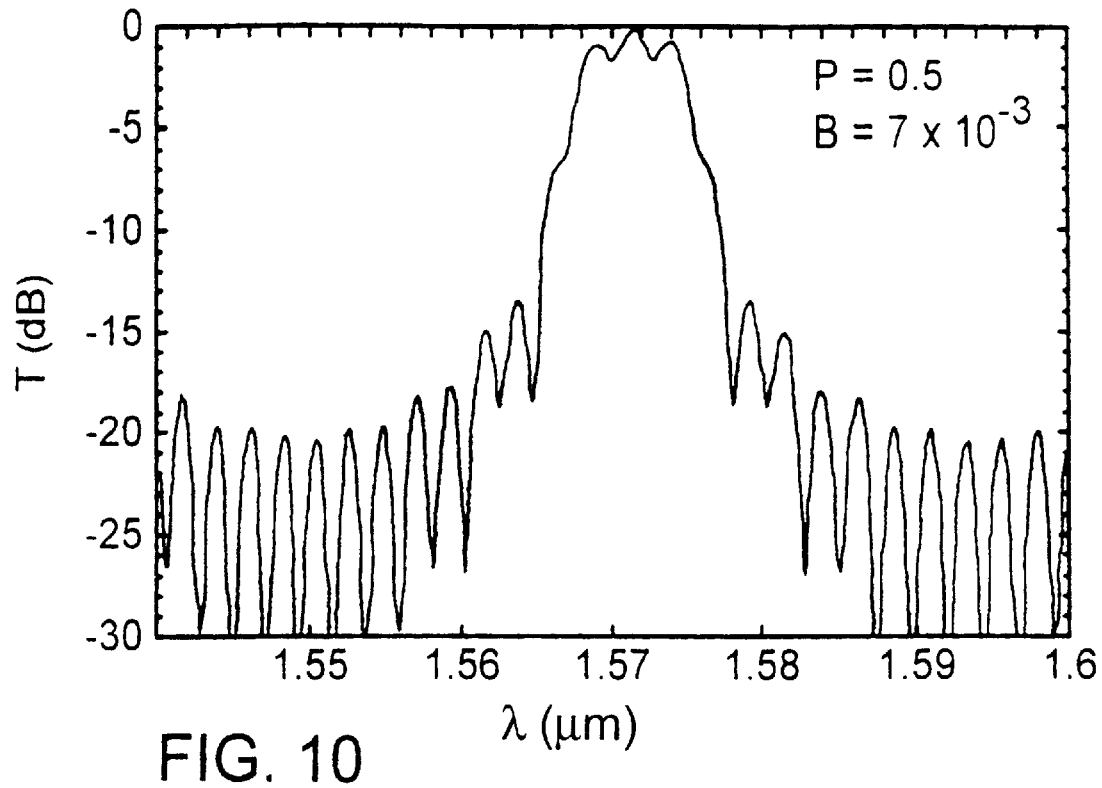
FIGS. 10 to 13 show passband broadened AWGs as examples of the third embodiment, as plots of transmission T in dB versus wavelength λ in μm.
Figure 11:
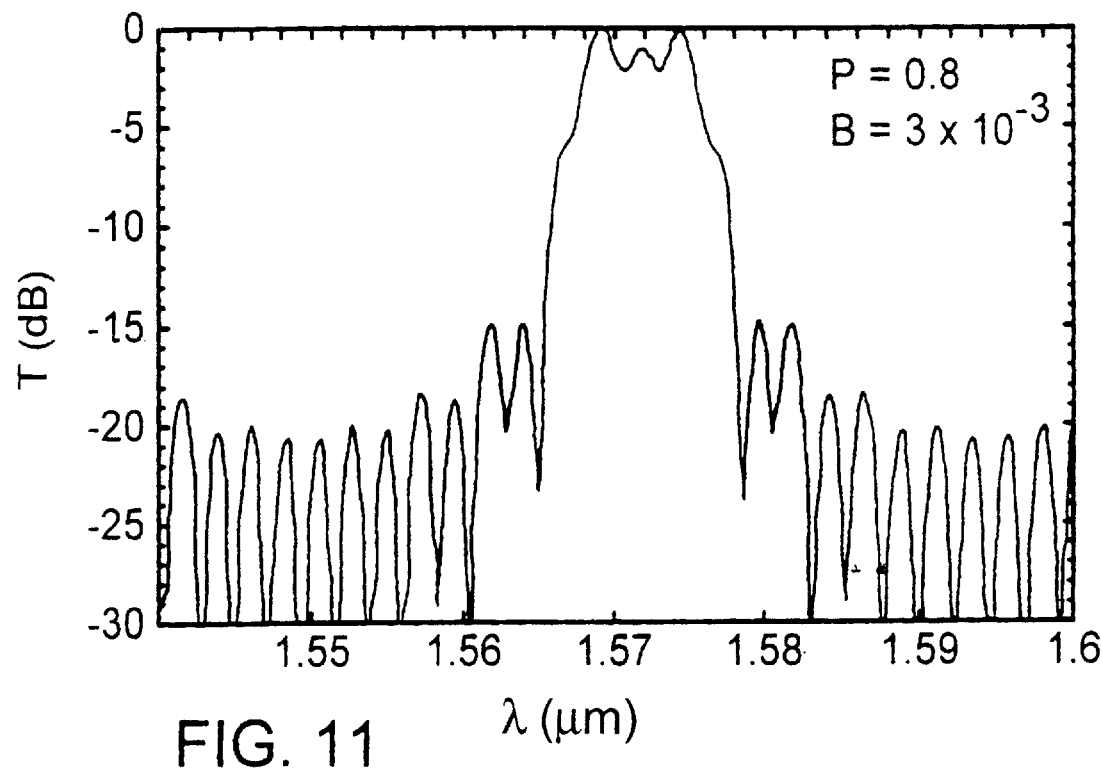
Figure 12:
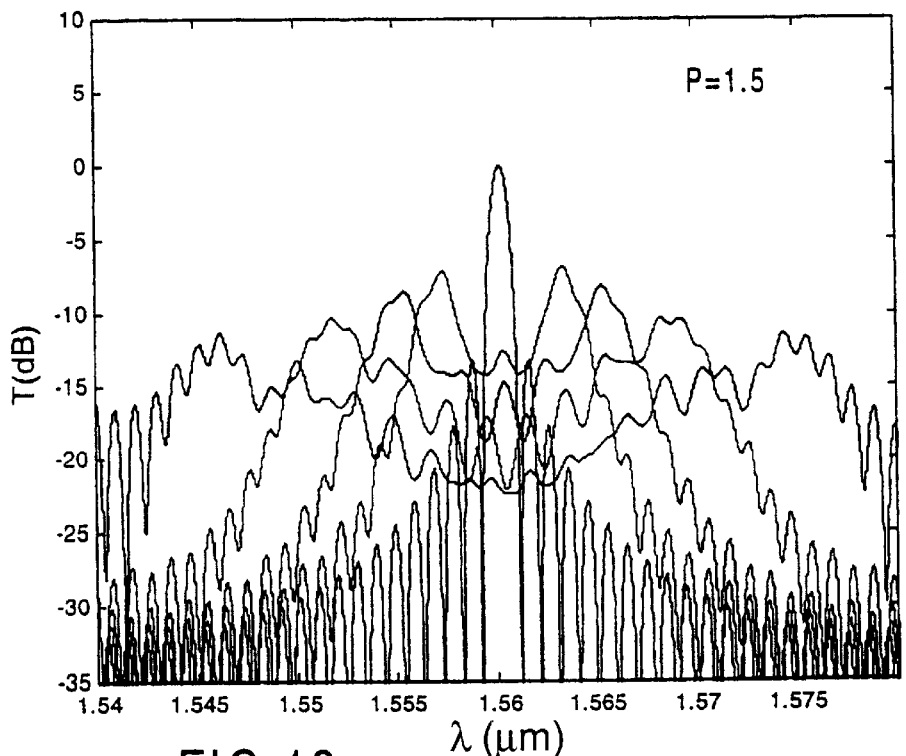
Figure 13:
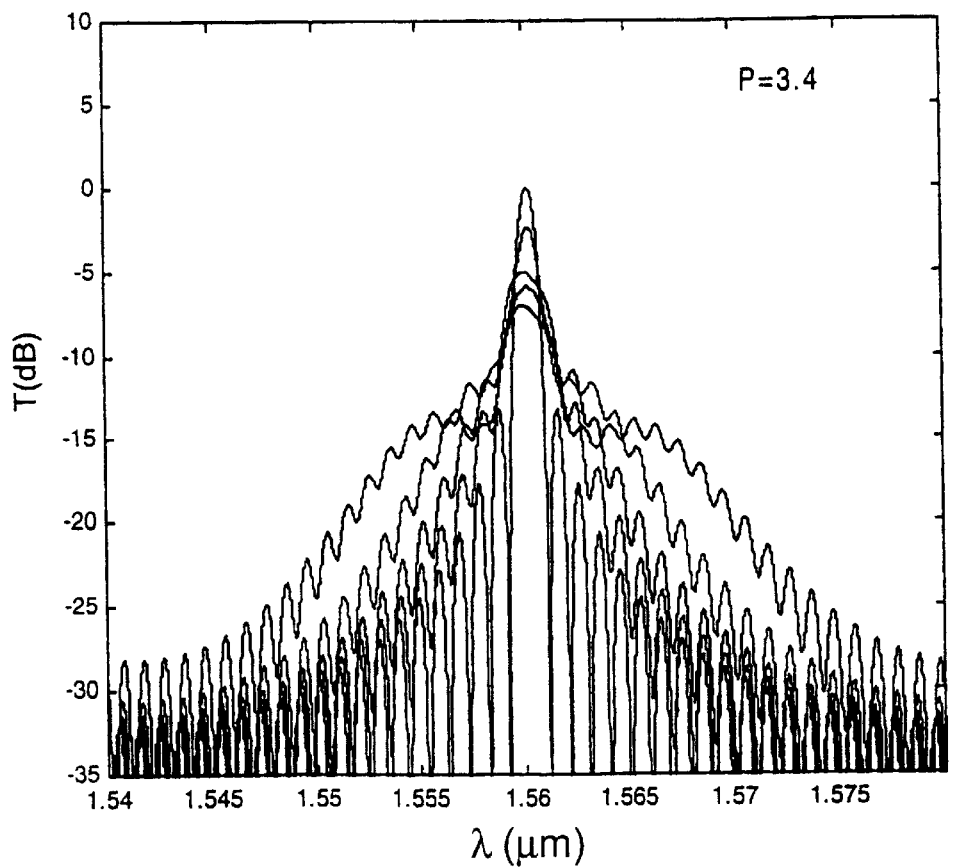
Figure 14:
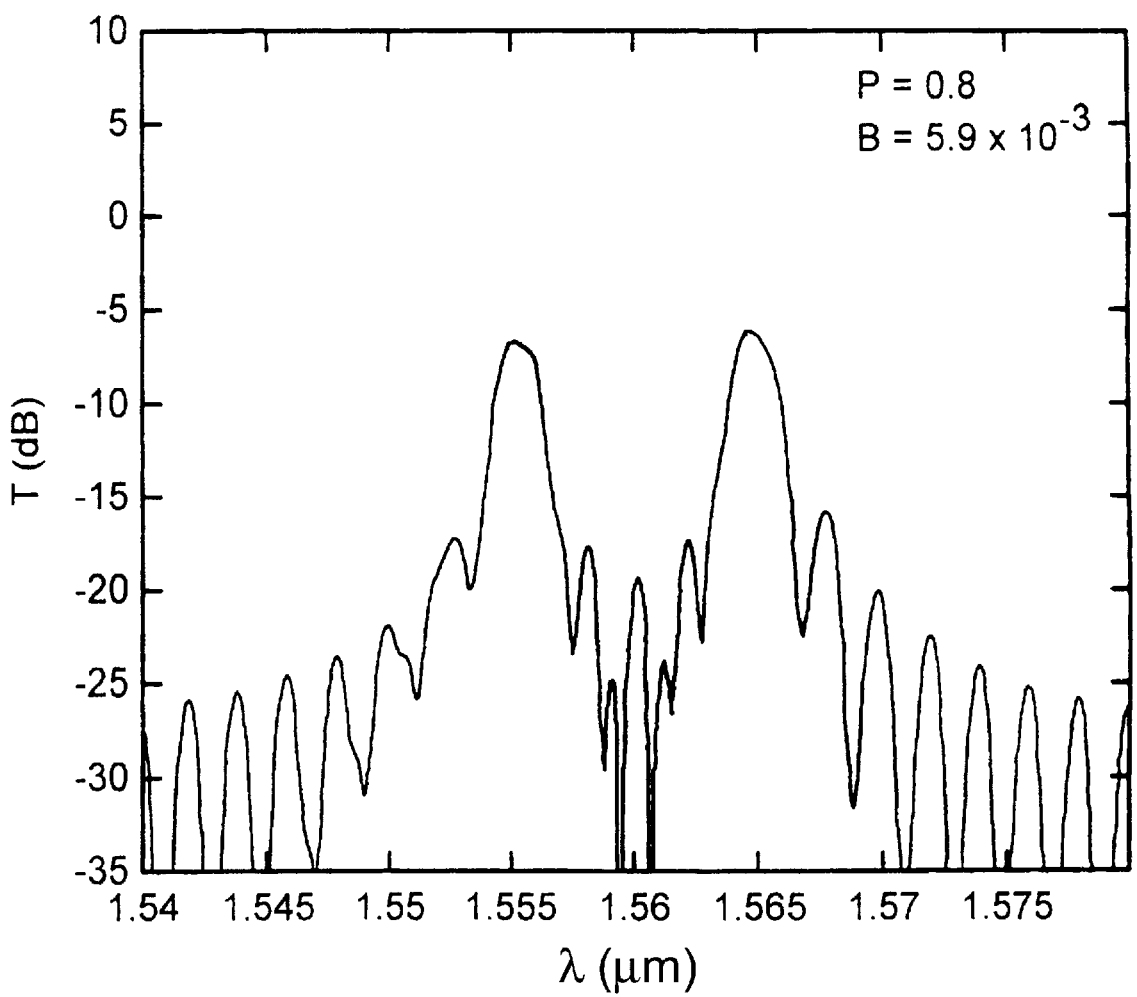
FIG. 14 shows a twin-passband AWG as an example of the third embodiment, as a plot of transmission T in dB versus wavelength λ in μm.

The phase control means 6 depicted in FIG. 9 has a linear shape on the input-side of the AWG and a parabolic shape on the output-side of the AWG, to impress a parabolic phase deviation on the wavefront. The parabolic shape can be described in terms of the theoretical description described above as:

$$y B[\mathrm{mod}(m-M/2)]^P \text{ with } P=2$$

With such a parabolic shape, the AWG of the third embodiment thus has fundamentally the same physical effect as the AWG of the first embodiment. The only difference between the functioning of the AWG of the first and third embodiments is that in the third embodiment the amount of the parabolic deviation can be changed by changing the voltage, or current, applied to the phase control means 6. In terms of the theoretical description, this amounts to the parameter B being a function of an electrical control signal, which may be a current signal or voltage signal depending on the technology used to fabricate the AWG. That is the parameter B=f(I) or B=f(V). The degree of passband broadening in the AWG of the third embodiment can thus be varied to an optimum level for the application and device concerned, for example continuously with a feed-back process or once at manufacture or whenever a recalibration is deemed necessary, e.g. after installation.

Examples of the third embodiment may have lower or higher order non-integer profiles greater than one, for example P=1.5 and P=3.4, or less than one, for example P=0.5 and P=0.8, these examples being described by equation (1) in conjunction with the following formula:

$$\alpha = m + B[\mathrm{mod}(m-M/2)]^P \tag{1d}$$

AWGs of this kind with P>1 and P<1 may be viewed as AWG analogues of concave and convex lenses respectively.

FIGS. 10 to 13 shows examples, for passband broadening, with P=0.5, P=0.8, P=1.5 and 3.4 respectively, the plots being similar to that of FIG. 2. That is FIGS. 10 to 13 show the passband broadening as a plot of transmission T in dB versus wavelength λ in μm.

The shape of the phase control means may also follow the non-parabolic profile discussed with reference to the second embodiment.

Figure 15:
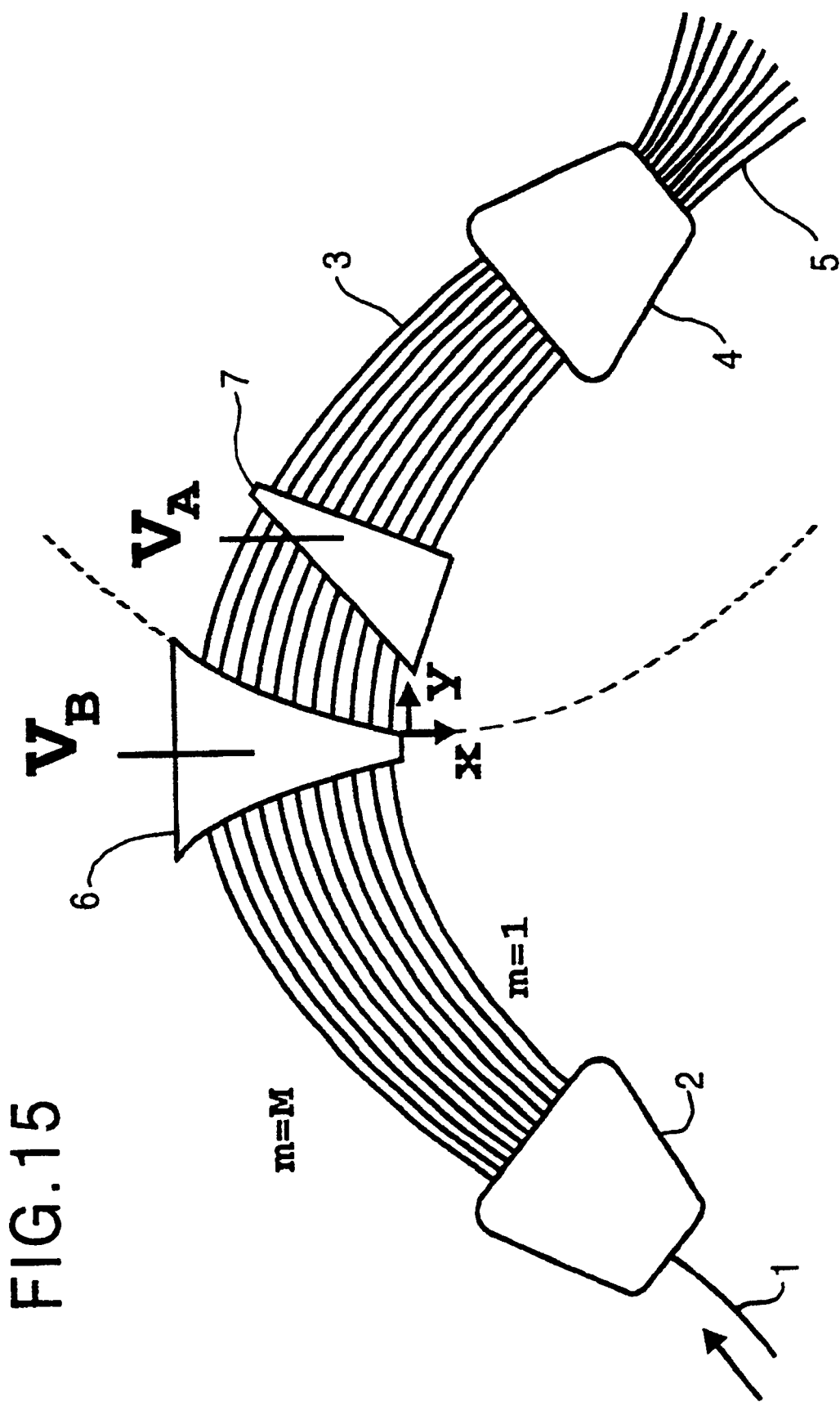
FIG. 15 is a schematic diagram of an AWG according to a fourth embodiment of the invention.

A fourth embodiment of the invention is now described with reference to FIGS. 15 to 18. The AWG of the fourth embodiment is similar to that of the third embodiment in two respects. Firstly, the phase control means 6 has a parabolic profile both on the input and output sides of the AWG, as shown schematically in FIG. 15. Secondly there is an additional component 7 which is a further phase control means which can serve to compensate for a centre-wavelength shift produced by the parabolic phase shift means 6. The centre-wavelength shift is a side-effect of the parabolic phase shift means 6 which causes increasing phase differences between adjacent guides resulting in the desired passband widening due to superposition of the detuned spectra. The asymmetric parabolic phase shift means 6 produces a centre-wavelength shift, which may be viewed as a side-effect of the desired phase profiling. To remove this centre-wavelength shift, the further phase shift means 7 is trapezoidal (or triangular) in shape, as shown schematically in FIG. 15. The phase shift means 6 and further phase shift means 7 are arranged so that one of them has a greater extent for channels of low channel number m and the other greater extent for channels of high channel number m. In FIG. 15 it is the trapezoidal phase shift means 7 which is of greater extent for low channel number m and the parabolic phase shift means 6 which is of greater extent for high channel number m. The phase shift means 6 and 7 are shown in FIG. 15 as being controllable with control signals $V_B$ and $V_A$ respectively, as would be the case when the AWG is fabricated with the lithium niobate technology, the phase shift means 6 and 7 taking the form of electrodes in such a case.

In addition to the centre-wavelength compensation, the trapezoidal phase shift means 7 provides the additional benefit of absolute wavelength tunability, to both higher and lower wavelengths, which allows the AWG to be used as an active, or programmable, AWG.

Moreover, the trapezoidal phase shift means 7 provides the still further benefit of the capability of controlling the FSR of the AWG, as will become apparent from the discussion of FIG. 18 further below.

The AWG of the fourth embodiment can be described with equation (1) above, but in conjunction with the following equation rather than equation (1a), namely:

$$\alpha = m + Am + Bm^2 \tag{1b}$$

for a parabolic phase shift means 6, where B=f($I_B$ or $V_B$) as discussed above and the additional coefficient "A" relates to the trapezoidal phase shift means 7, the coefficient "A" being a function of a further applied control signal, i.e. A=f ($I_A$ or $V_A$).

The condition to be satisfied to achieve a broadened spectrum of 3 dB-width Δλ centred on a wavelength $\lambda_1$ can then be approximated to:

$$B = \frac{2(\Delta\lambda - \Delta\lambda_0)}{\pi\lambda_0(M-1)} \tag{2b}$$

and $$A = -(m-1)B + (\lambda_0 - \lambda_1)/\lambda_0 \tag{3b}$$

For example, for an AWG based on lithium niobate technology and using a z-cut crystal then for a desired passband of Δλ=18.3 nm and device parameters M=40, Δl=35 μm, $\lambda_0$=1.541 μm and n=2.2 equations (2b) and (3b) give A=−7.2×10$^{-3}$ and B=1.9×10$^{-4}$. With the electro-optic coefficient $r_{33}$=30.8×10$^{-12}$ m/V the required voltages for the trapezoidal and parabolic electrodes 7 and 6, $V_A$ and $V_B$ respectively, are each of the order of 10V.

FIG. 16 shows the passband broadening for this example of the fourth embodiment as a plot of transmission T in dB versus wavelength λ in μm. The 3 dB-passband width increases from 0.77 to 18.3 nm as the transmission power decreases by 13 dB from the B=0 value, where increasing B denotes increasing electrode voltage $V_B$. As can be seen, the passband remains substantially flat as the passband width is increased by increasing the applied voltage to the electrodes. The effect is analogous to the action of a synthetic concave lens.

FIG. 17 shows the variation in maximum ripple $R_{MAX}$ in dB versus normalised passband width Δλ/FSR for a free spectral range of FSR=27.3 nm for the example of the fourth embodiment.

FIG. 18 shows the variation in out-of-band noise suppression (i.e. signal-to-noise ratio) NS in dB versus normalised passband width Δλ/FSR for a free spectral range of FSR=27.3 nm for the example of the fourth embodiment.

FIGS. 17 and 18 show that, as the passband width is increased, the passband ripple increases and the out-of-band noise suppression decreases. In general there will be a maximum practical passband broadening which in the present example is approximately 0.6 FSR.

In a variant of the fourth embodiment, a third phase shift means (not shown) having a cubic profile and/or a fourth phase shift means (not shown) having a quadrature profile etc. may be included. In general, an AWG with multiple polynomial profile phase shift means can be described by equations (1) above in conjunction with the formula:

$$\alpha = m + Am + Bm^2 + Cm^3 + Dm^4 \quad (1c)$$

Additional higher-order polynomial profile phase shift means allow further tailoring of the spectral filtering characteristics to be realised with lower passband ripple and higher signal-to-noise ratio. As is apparent from the theoretical descriptions given above, the techniques of synthetic aperture theory can be applied to address issues such as dynamic spectral equalisation and segmented passbands.

Indeed, an infinite expansion of the series of equation (1c) can describe any phase profile. To produce an arbitrary profile it may be preferred to replace a single electrode, or equivalent, with a plurality of electrodes, one for each channel. The desired arbitrary phase profile can then be generated by applying m voltage levels $V_m$ to the m electrodes. Phase modulation using arbitrary phase profiles is the subject of the fifth embodiment, described further below.

Further variants of the fourth embodiment may substitute the parabolic phase shift means 6 with a phase shift means shaped to provide a non-parabolic profiling of the kind discussed in connection with the third embodiment. In that case, equation (1d) would be modified by setting M/2=0, the mod function becoming redundant, to take account of the asymmetry of the phase shift means 6 about the channels, i.e. in that case $\alpha = m + Bm^P$.

All of the first to fourth embodiments and their variants described above have in common that the spectral passband characteristic is tailored, in the above cases broadened or split into multiple passbands, by introducing phase modulation in the waveguiding channels 3 which departs from the linear modulation of standard AWGs. That is, the above-described embodiments tailor the passband without the use of amplitude modulation.

In addition to the above-described theoretical framework non-deterministic non-linear algorithms such as simulated annealing, which are described in an article by M. A. Seldowitz et al, Applied Optics, volume 26, pages 2788 to 2798 (1987), or holographic techniques, which are described in an article by M. C. Parker et al, IEEE Photon Technol. Letters volume 9, pages 529 to 531, may be used to obtain a phase profile across the channels 3 to produce a desired spectral passband characteristic, i.e a profile not containing any amplitude modulation components. This is in contrast to deterministic linear algorithms which will find only mixed phase and amplitude solutions.

Figure 19:
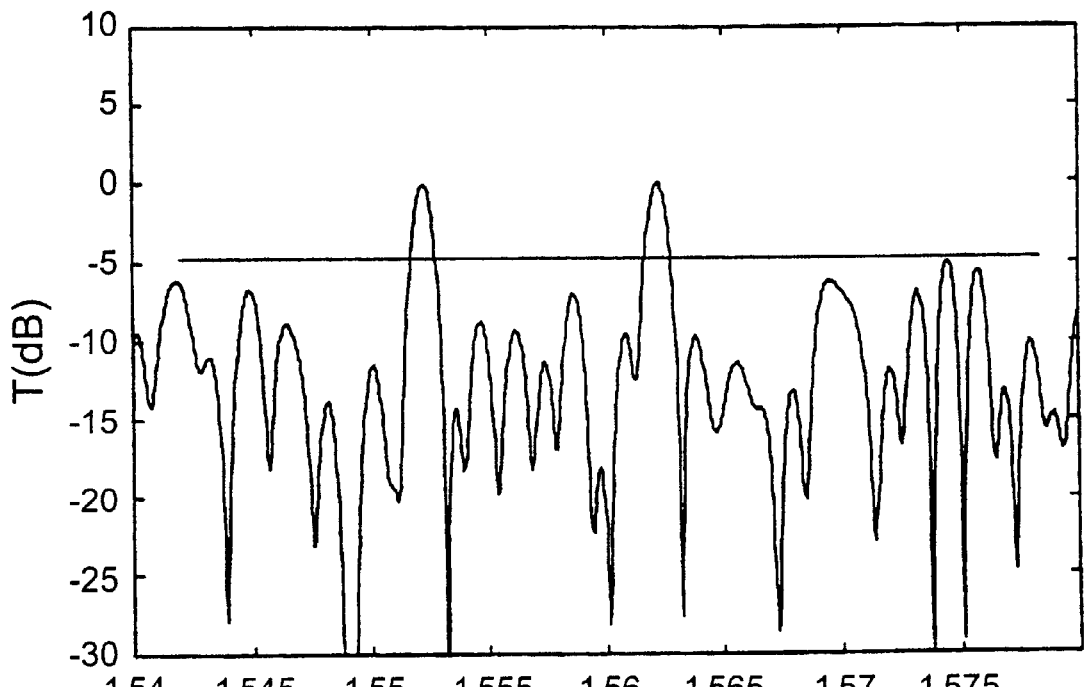
FIG. 19 show an example of the transmission T over one FSR of the output of the device in dB versus wavelength λ in μm of a twin passband AWG having 40 channels and according to a fifth embodiment.
Figure 20:
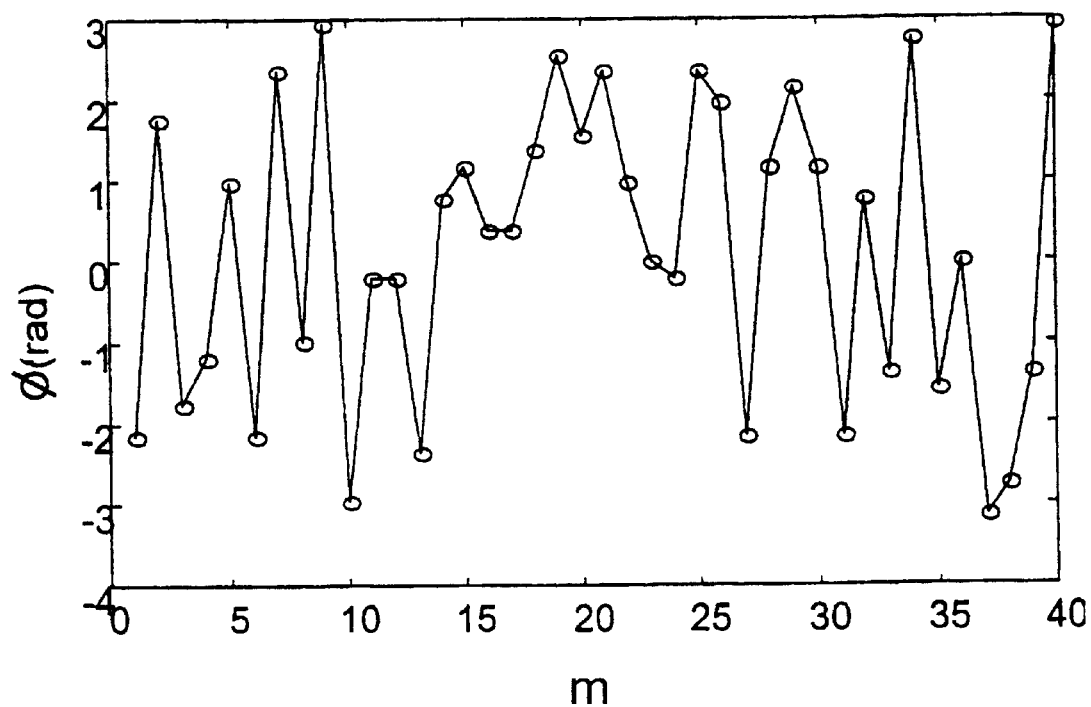
FIG. 20 shows the phase deviation φ in radians, from a standard linear phase profile, versus channel number m for the example of FIG. 19.

FIG. 19 shows an example, for a fifth embodiment of the invention, of the transmission T in dB versus wavelength $\lambda$ in $\mu$m of a twin passband AWG having a phase deviation from the standard linear one as shown in FIG. 20, as calculated from a simulated annealing algorithm, and for a total number of waveguiding channels m=40. The phase deviation $\phi$ is in radians from a standard linear progression. It is noted that the usual periodic property of the AWG is retained notwithstanding the imposition of an irregular, arbitrary-looking phase profile deviation. That is, FIG. 19 shows the output over a single free spectral range of the AWG, this output being periodically repeated across the wavelength spectrum. As is evident from FIG. 20, the deviation from the standard linear phase profile is asymmetric about the centre channel.

Figure 21:
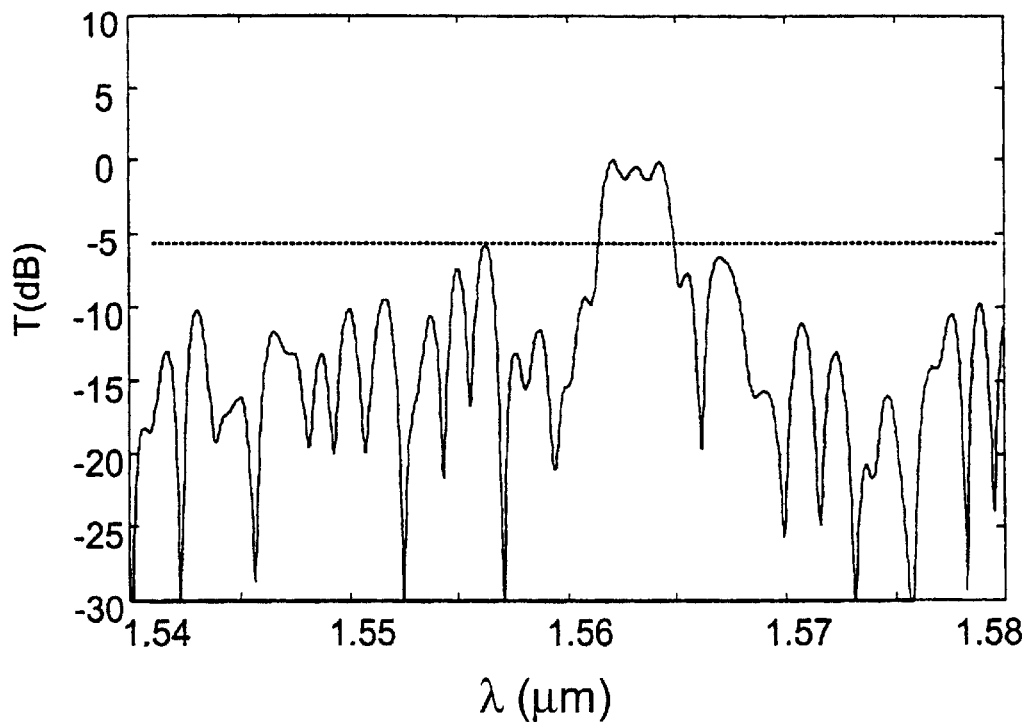
FIG. 21 show an example of the transmission T in dB versus wavelength λ in μm of a passband broadened AWG having 40 channels and according to the fifth embodiment.
Figure 22:
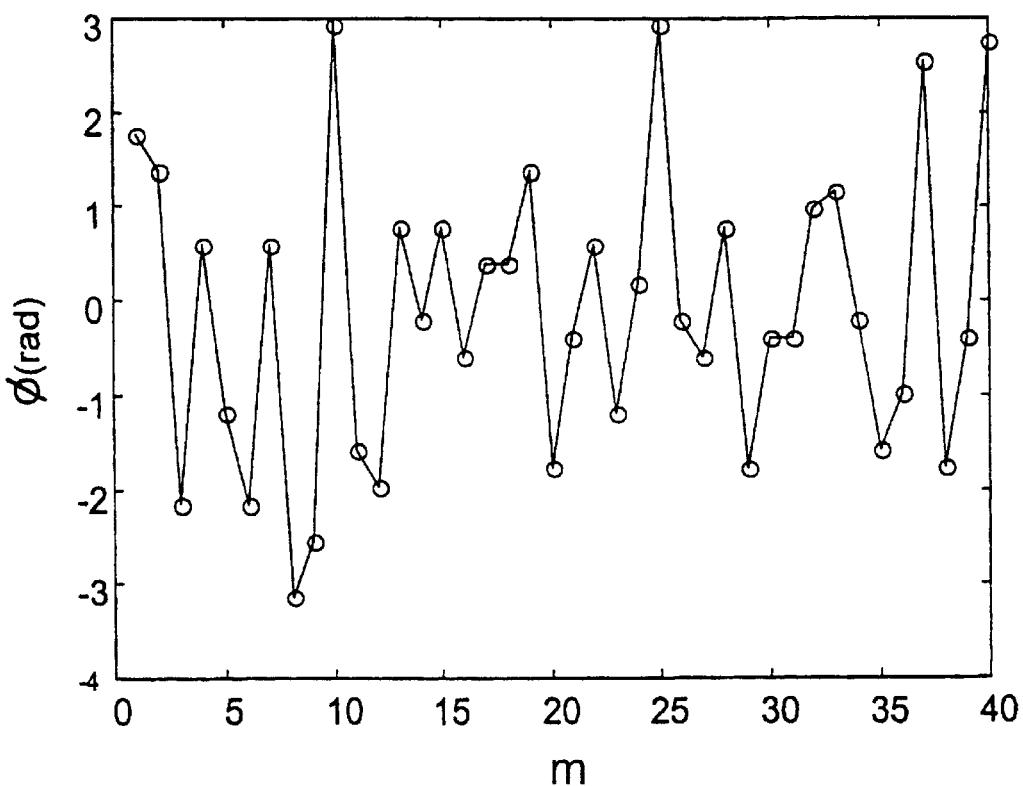
FIG. 22 shows the phase deviation φ in radians, from a standard linear phase profile, versus channel number m for the example of FIG. 21.

The simulated annealing algorithm is also capable of generating a passband which is spectrally broadened, similar to the first to fourth embodiments, as is shown in FIGS. 21 and 22.

FIG. 21 shows a further example of the fifth embodiment of the invention, of the transmission T in dB versus wavelength $\lambda$ in $\mu$m of a passband broadened AWG having a phase deviation from the standard linear one as shown in FIG. 22, as calculated from a simulated annealing algorithm. Similar comments apply as to those made in relation to FIGS. 19 and 20.

Other passbands may be desirable in certain applications, such as passbands for spectral equalisation, noise suppression, tuning, or wavelength selective amplification/attenuation. Wavelength selective amplification/attenuation has an application in WDM long-haul fibre transmission to compensate at repeater stations for the wavelength dependence (and hence WDM channel dependence) of the attenuation between repeater stations.

Such non-deterministic techniques thus provide ways of calculating what phase profile deviation is needed to obtain any desired end result in terms of passband modification. The solutions all have in common that the passband tailoring is achieved with phase modulation alone, i.e. with no amplitude modulation, hence avoiding intrinsic losses associated with amplitude modulation.

Amplitude modulation can however be used for tailoring the passband of an AWG having a conventional linear phase profile characterised by a single optical path length increment $\Delta l$, as is now described with reference to FIGS. 23 to 26 which show sixth and seventh embodiments of the invention.

Figure 23:
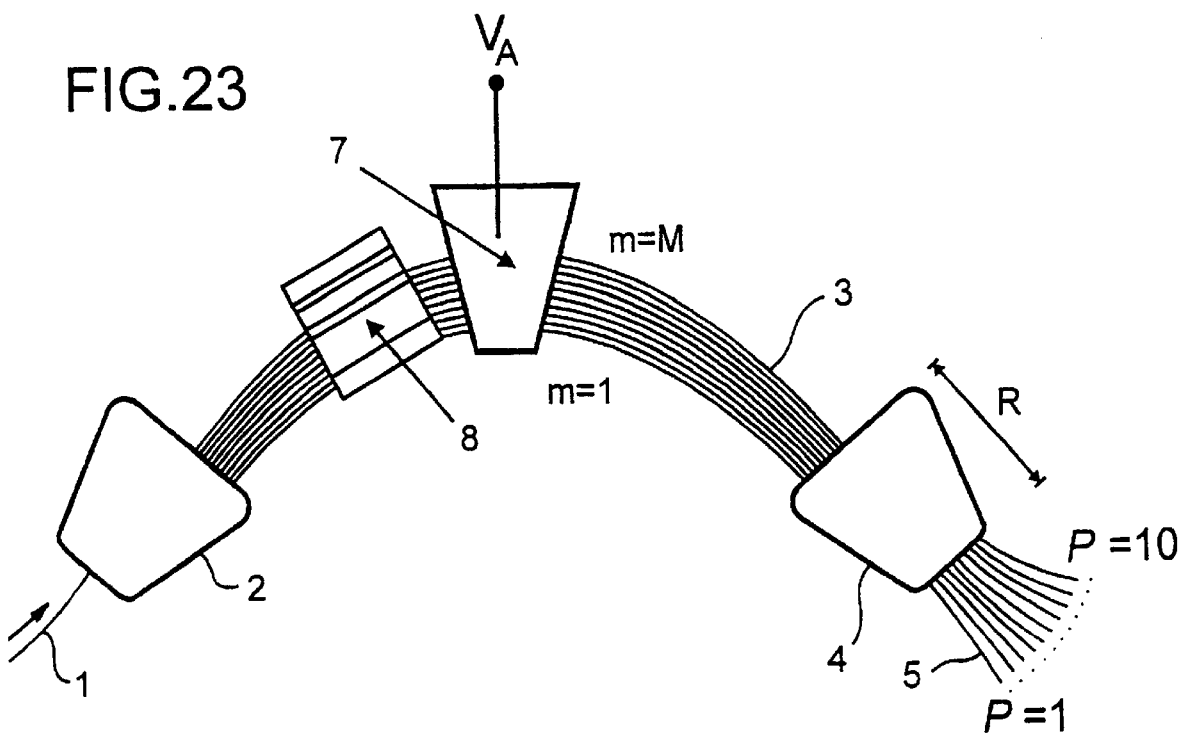
FIG. 23 is a schematic diagram of an AWG according to a sixth embodiment of the invention.

FIG. 23 is a schematic diagram of an AWG according to a sixth embodiment of the invention.

The general form of the AWG is similar to that of a conventional active AWG having a phase control means 7, for example an electrode as shown in FIG. 23, or having a structure according to that of U.S. Pat. No. 5,515,460. The AWG additionally comprises the conventional features of an input channel 1, an input-side free-space region 2, a plurality of waveguides 3, an output-side free-space region 4 and a plurality of output channels 5, indexed with the letter P in FIG. 23. The letter R denotes the characteristic length of the free space regions 2 and 4.

The additional feature of the AWG of the sixth embodiment is amplitude modulation means 8 which provides a passband tailoring function by allowing the light passing through each channel to be attenuated by a desired amount.

Figure 24:
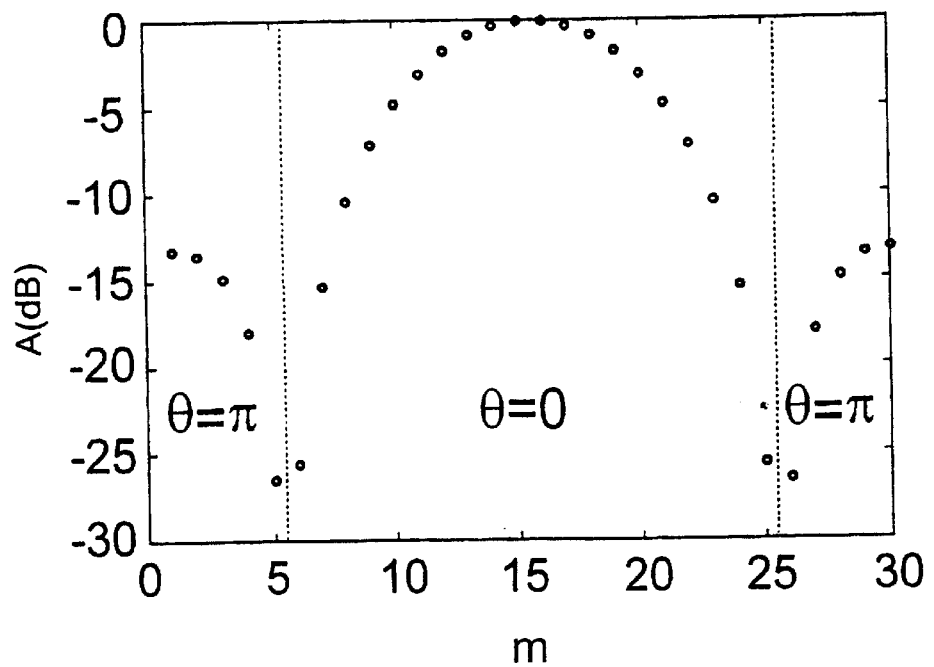
FIG. 24 shows the amplitude modulation profile of an example of the sixth embodiment.

The passband tailoring of the sixth embodiment is passband broadening. Passband broadening is achieved by constructing the amplitude modulation means 8 so as to provide the attenuation profile A across the m channels 3 that is shown in FIG. 24 in terms of dB. The attenuation profile is symmetrical about the centre of the channels, at which there is zero attenuation, and is described by a sinc function. In addition to the amplitude modulation, there is a phase change of half a period, i.e. $\pi$, in the optical path length of channels m=1 to 5 and m=26 to 30, i.e. those channels which lie beyond the poles in the sinc function.

The attenuation profile may be fixed by manufacture, i.e. passive, or may be induced in response to an electrical control signal, i.e. active.

A sinc function is selected since the Fourier transform of such a function is a rectangular pulse function and, since an AWG can be described in terms of Fourier optics, will produce the desired spectral broadening at the output side.

Exploiting the realisation of the Fourier properties of an AWG, other functional forms of the attenuation profile across the channels 3 can be readily selected from a knowledge of Fourier transform pairs to provide a desired broadening profile at the output, or indeed to provide any other output profile for achieving a desired passband tailoring, e.g. a raised cosine profile.

For example a gaussian attenuation profile of one half width can be used to produce a gaussian broadening of the passband, the Fourier transform of a gaussian function being another gaussian function.

Figure 25:
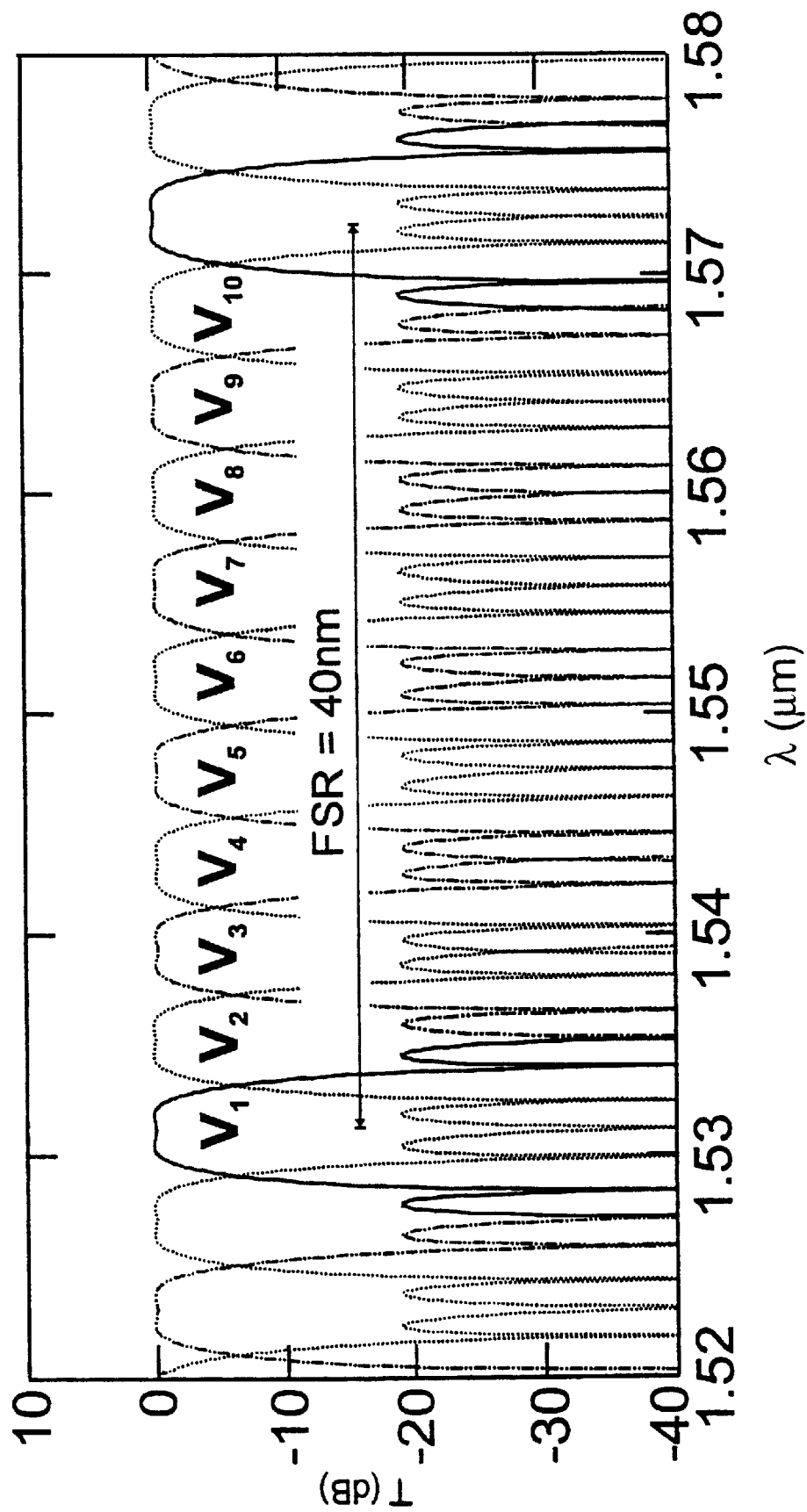
FIG. 25 shows the passband characteristics of an example of the sixth embodiment.

FIG. 25 shows the spectral transmissions through output port P=1 as the voltage $V_A$ applied to the phase modulation means 7 is varied through a sequence of discrete values in the range $V_A=V_1$ to $V_{10}$, to output to any one of 10 output ports. The response of the other output ports is the same, excepting that the voltage values are cyclically rotated as a result of the known cyclical (i.e. periodic) property of an AWG. As can be seen from FIG. 25, near-rectangular passbands of 4 nm 3 dB-width are produced.

The phase modulation means 7, having a trapezoidal shape active region, can for example be used to provide temperature stabilisation, by adjusting the electrical control signal applied thereto under feedback control. Such an implementation would be practical if the AWG is situated in an exchange, i.e. in an environment in which the additional complexity of active control is acceptable.

The spectral distribution $t(\lambda)$ emerging from output port P of an active AWG of the sixth embodiment can be described by the equation:

$$t(\lambda, P) = (wh/\lambda R) \sum_{m=1}^{M} a_m E_m \exp[j(2\pi nm/\lambda)(\Delta l\{1 + n^2 r_{33} V/2w\} - PWD/R)] \quad (6)$$

where the parameters introduced for the first time in this equation are:

$E_m$ electric-field distribution of the optical signal across the M waveguides;

h, w the waveguide heights and widths respectively;

D the distance between waveguides;

W the distance between output ports at the fan-in section; and $a_m$ the attenuation in the mth waveguide.

The results shown in FIGS. 24 and 25 are for the following parameter values: n=2.2 and $r_{33}=30.8 \times 10^{-12}$ mV$^{-1}$ (i.e. a lithium niobate substrate), M=30, w=h=5 µm, D=W=10 µm, R=1.42 mm, $\Delta l$=27.3 µm and $a_m$ is defined by the equation:

$$a_m = \sin\{(2m-M-1)\pi\Delta\lambda/2\lambda_{FSR}\}/(2m-M-1)\text{Max}[a_m] \quad (6a)$$

where $\Delta\lambda$ is the 3 dB-passband width;

$\lambda_{FSR}$ is the free spectral range of the AWG; and

Max[m] is a normalisation factor providing zero attenuation at the centre wavelength.

Equation (6) assumes the normal case of equal intensity contributions input to each waveguide channel.

For this example the overall signal attenuation is 5 dB.

In a variant of the sixth embodiment, the phase modulation means 7 is dispensed with in which case a passive AWG with otherwise similar passband tailoring results. Such an implementation may be preferable if the AWG is situated in an optical network downstream of the exchange, i.e. in an environment in which the passive devices may be preferred.

Figure 26:
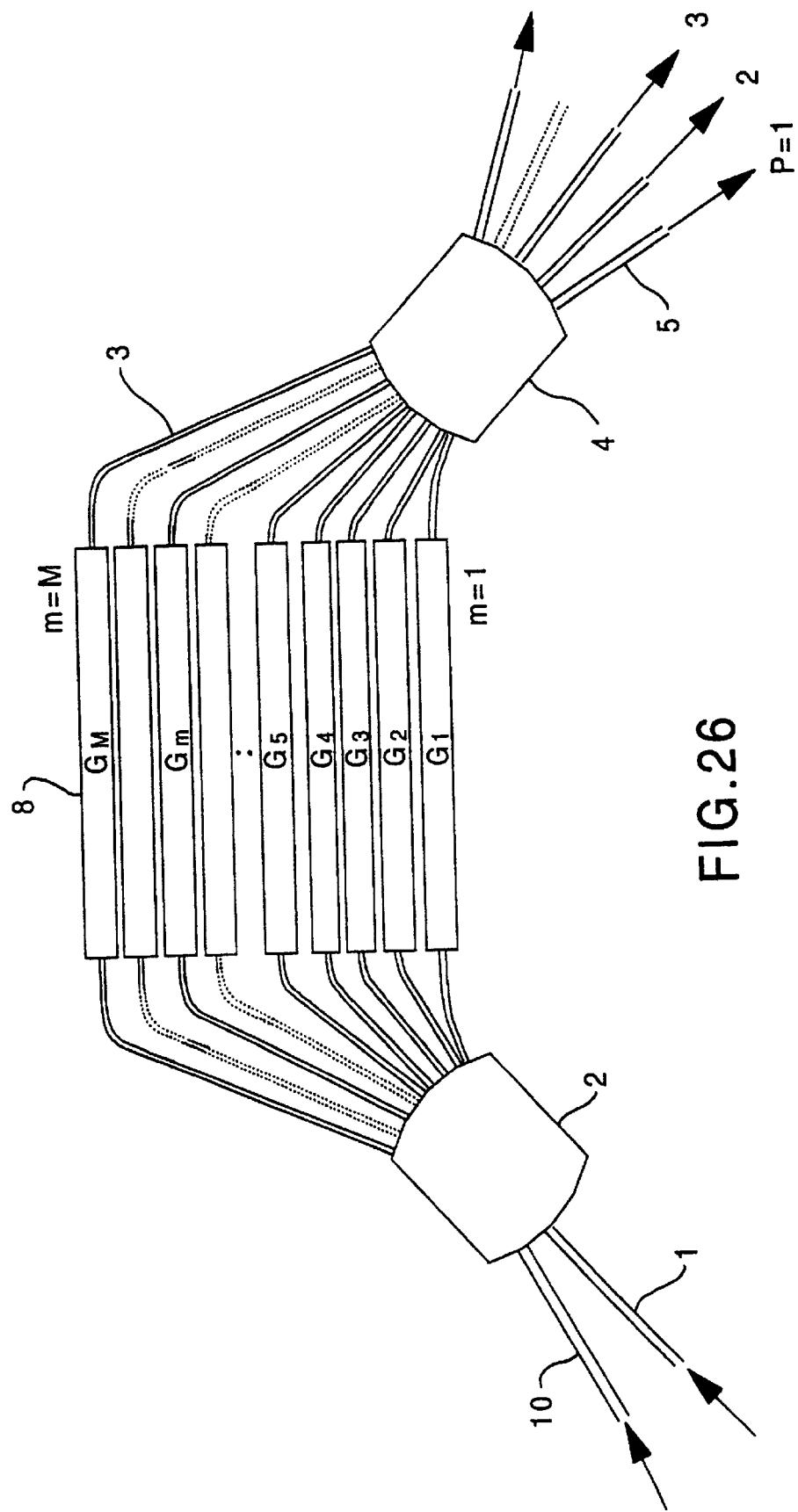
FIG. 26 is a schematic diagram of an AWG according to a seventh embodiment of the invention.

FIG. 26 is a schematic diagram of an AWG according to a seventh embodiment of the invention.

The AWG of the seventh embodiment can be considered to be similar to that of the variant of the sixth embodiment, comprising an amplitude modulation means 8, but no phase modulation means.

The AWG of the seventh embodiment differs from that of the sixth embodiment in that respective sections of the waveguiding channels m are provided with amplification means to provide respective gain levels $G_m$. For example a silica substrate can be variably doped with a rare earth element such as erbium following the procedure described in J. A. Bebbington et al, Applied Physics Letters, volume 62, pages 337 to 339 (1993). Amplification is induced by the provision of a pump beam at a further input port 10 distinct from the input port 1 for the signal carrying beam of light. Alternatively a common input port may be used for both signal and pump beams. Amplification is thus produced in the channels by optical pumping in the manner known from optical fibre telecommunications technology.

With the AWG of the seventh embodiment it is thus possible for example to provide amplitude modulation in the form of a sinc function, i.e. amplitude modulation having the functional form shown in FIG. 24 in respect of the sixth embodiment. However, in the case of the seventh embodiment, the y-axis will not be attenuation, but relative intensity, the absolute intensity values being dependent on the gain levels $G_m$.

The response $t(\lambda)$ of an active AWG of the seventh embodiment can be described by the equation:

$$t(\lambda) = \sum_{m=1}^{M} \{2 f_m f_m'/(2m-1)\}\sin x \cos y \quad (7)$$

where $x=(2m-1)\pi\Delta\lambda/2\lambda_{FSR}$ and $y=(2m-1)(\pi n \Delta l/\lambda = \phi_p/2)$ which can be truncated and expressed as:

$$t(\lambda) = \sum_{m=1}^{M} \{f_m f_m'/(2m-M-1)\}\sin x \exp y \quad (7')$$

where $x=(2m-M-1)\pi\Delta\lambda/2\lambda_{FSR}$ and $y=jm(2\pi n \Delta l/\lambda = \phi_p)$ where the parameters introduced for the first time in these equations are:

$\phi_p$ the phase difference associated with the Pth output port; and $f_m, f_m'$ the coupling coefficients for the fan-in and fan-out sections respectively.

The amplitude in the mth channel, defined by the gain parameter $G_m$, is given by the coefficient of the exponential in equation (7').

A specific example of the seventh embodiment has the following parameter values: M=30; $\Delta\lambda$=4 nm; $\lambda_{FSR}$=40 nm; and $\Delta l$=39 µm. An overall power loss of around 5 dB results. The cross-talk is better than 18 dB and the −25 dB to −3 dB form ratio of the passband is 1.57.

As an alternative to providing selective attenuation or gain means in the channels 3, channel selective amplitude modulation may be achieved through variation of $f_m$ and/or $f_m'$, that is by designing the apertures to the channels 3 so that the coupling efficiency of light components entering or exiting the free space regions respectively from or to the channels varies so as to produce an overall channel transmission efficiency which imposes a desired amplitude modulation profile across the device. Variants of the fifth and sixth embodiments may thus be produced.

A seventh embodiment of the invention is a variation of the sixth embodiment shown in FIG. 26 in which all the channel gain coefficients $G_m$ are set equal. An AWG is thus provided which has a uniform amplitude modulation profile, as is the case for a conventional AWG. The spectral passband characteristics are thus the same as a conventional AWG, i.e. there is no broadening of the passband. However, unlike a conventional AWG, there is built-in amplification, or at least attenuation compensation, which may be desirable.

What is claimed is:

1. An arrayed waveguide grating device having a series of waveguiding channels interconnecting two free space regions across which light inputting and outputting the device passes, there being differences in optical path length between any two of said channels lying adjacent to one other in said series which differences are defined by respective optical path length increments, wherein the optical path length progression across said channels is non-linear, not being defined by any one value of the path length increments, nor by a plural number of values of the path length increments each defining a linear optical path length progression of a subset of at least three of said channels, and wherein the optical path length increments successively increase from a minimum increment value, starting at one of said channels.

2. A device according to claim 1 wherein the starting channel is a channel at or close to the end of the series, whereby the optical path length increments successively increase across substantially all of the channels of the series.

3. A device according to claim 2, wherein the starting channel is at an end of the series at which end the channels have lower optical path lengths.

4. A device according to claim 2, wherein the starting channel is at an end of the series at which end the channels have higher optical path lengths.

5. A device according to claim 1 wherein said starting channel is a channel at or close to the mid point of the series, whereby the optical path length increments successively increase towards both ends of the series.

6. A device according to claim 1 wherein said successively increasing optical path length increments are defined by a function proportional to channel number in said series, counted from said starting channel, raised to the power of a factor P.

7. A device according to claim 6, wherein the factor P=1.85 to 2.25.

8. A device according to claim 6, wherein the factor P is approximately two, to provide a parabolic progression of optical path length increment.

9. A device according to claim 6, wherein the factor P has a value approximately equal to one of 0.5, 0.8, 1.5, 2.1 and 3.4.

10. A device according to claim 6, wherein the factor P is greater than one.

11. A device according to claim 6, wherein the factor P is less than one and greater than zero.

12. A device according to claim 1 wherein the path length increments vary irregularly across the series of channels.

13. A device according to claim 12 wherein some of the optical path length increments are positive and some are negative in value.

14. A device according to claim 13 wherein the values of the irregularly varying optical path length increments are such that the device has a passband which at least approximates to a function known, from one of signal theory and aperture theory, to provide filtering properties.

15. A device according to claim 13 wherein the filtering properties are one of passband broadening, passband equalization, passband segmentation into at least two passbands and wavelength-selective amplification/attenuation across the passband.

16. An arrayed waveguide grating device having a series of waveguiding channels interconnecting two free space regions across which light inputting and outputting the device passes, there being differences in optical path length between any two of said channels lying adjacent to one other in said series which differences are defined by respective optical path length increments, there being means operable to change the optical path length increments so that the optical path length increments can be made to follow an optical path length progression across said channels which is non-linear, not being defined by any one value of the path length increments, nor by a plural number of values of the path length increments each defining a linear optical path length progression of a subset of at least three of said channels.

17. A device according to claim 16 and comprising means operable to change the optical path length increments so that the optical path length increments can be made to successively increase from a minimum increment value starting at one of said channels.

18. A device according to claim 17 further comprising means operable to change the optical path lengths of the channels so as to vary each of the optical path length increments by a substantially equal amount.

19. A device according to claim 18, wherein said optical path length changing means comprises an input for receiving a further electrical control signal the level of which defines said substantially equal amount.

20. A device according to claim 16 wherein said successively increasing optical path length increments are defined by a function proportional to channel number in said series, counted from said starting channel, raised to the power of a factor P.

21. A device according to claim 20, wherein the factor P=1.85 to 2.25.

22. A device according to claim 20, wherein the factor P is approximately two, to provide a parabolic progression of optical path length increment.

23. A device according to claim 20, wherein the factor P has a value approximately equal to one of 0.5, 0.8, 1.5, 2.1 and 3.4.

24. A device according to claim 20, wherein the factor P is greater than one.

25. A device according to claim 20, wherein the factor P is less than one and greater than zero.

26. A device according to claim 16 wherein the path length increments vary irregularly across the series of channels.

27. A device according to claim 26 wherein some of the optical path length increments are positive and some are negative in value.

28. A device according to claim 27 wherein the values of the irregularly varying optical path length increments are such that the device has a passband which at least approximates to a function known, from one of signal theory and aperture theory, to provide filtering properties.

29. A device according to claim 27, wherein the filtering properties are one of passband broadening, passband equalization, passband segmentation into at least two passbands and wavelength-selective amplification/attenuation across the passband.

30. A method of designing an arrayed waveguide device according to claim 14 the method comprising:
    selecting a function defining a desired passband of the device;
    finding a solution to a set of non-deterministic equations to find a phase deviation from a linear phase profile for each of a plurality of waveguiding channels of the device with which a passband at least approximating to the desired passband can be obtained; and
    computing from the phase deviation the magnitude and sign of the path length increments for each of the channels of the series.

31. A method according to claim 30 using holographic techniques.

32. A method according to claim 30 using simulated annealing techniques.

33. An arrayed waveguide grating device comprising two free space regions, a series of waveguiding channels interconnecting the two free space regions, and input and output channels each connected to one of the two free space regions, there being means for modulating the amplitude of light passing through the series of waveguiding channels so as to provide an amplitude modulation profile across the series of channels which is non-uniform, and wherein the amplitude modulation means comprises means for attenuating and/or amplifying the level of light travelling within the channels.

34. An arrayed waveguide grating device comprising two free space regions, a series of waveguiding channels interconnecting the two free space regions, and input and output channels each connected to one of the two free space regions, there being means for modulating the amplitude of light passing through the series of waveguiding channels so as to provide an amplitude modulation profile across the series of channels which is non-uniform, and wherein the amplitude modulation means comprises means for modulating the efficiency with which light is coupled into and/or out of the channels, respectively from and/or to the free space regions.

35. An arrayed waveguide grating device comprising two free space regions, a series of waveguiding channels interconnecting the two free space regions, and input and output channels each connected to one of the two free space regions, there being means for modulating the amplitude of light passing through the series of waveguiding channels so as to provide an amplitude modulation profile across the series of channels which is non-uniform, and wherein the profile provides a device passband which at least approximates to a function known, from one of signal theory and aperture theory, to provide filtering properties.

36. A device according to claim 35, wherein the filtering properties are one of passband broadening, passband equalization, passband segmentation into at least two passbands and wavelength-selective amplification/attenuation across the passband.

37. A device according to claim 35, wherein the filtering property is passband broadening, the broadened passband having a shape approximating to a rectangular or square wave function.

38. An arrayed waveguide grating device comprising two free space regions, a series of waveguiding channels interconnecting the two free space regions, and input and output channels each connected to one of the two free space regions, there being means for modulating the amplitude of light passing through the series of waveguiding channels so as to provide an amplitude modulation profile across the series of channels which is non-uniform, and wherein said profile is defined by one of a sine function and a raised cosine function.

39. An arrayed waveguide grating device comprising two free space regions, a series of waveguiding channels interconnecting the two free space regions, and input and output channels each connected to one of the two free space regions, there being means for modulating the amplitude of light passing through the series of waveguiding channels so as to provide an amplitude modulation profile across the series of channels which is non-uniform, and wherein the level of amplitude modulation at one end of the series of channels approaches that at the other end of the series of channels.

40. An arrayed waveguide grating device comprising two free space regions, a series of waveguiding channels interconnecting the two free space regions, and input and output channels each connected to one of the two free space regions, there being means for modulating the amplitude of light passing through the series of waveguiding channels so as to provide an amplitude modulation profile across the series of channels which is non-uniform, and wherein the profile is at least approximately symmetrical about the mid point of the series of channels.

41. An arrayed waveguide grating device comprising two free space regions, a series of waveguiding channels interconnecting the two free space regions, and input and output channels each connected to one of the two free space regions, there being means for modulating the amplitude of light passing through the series of waveguiding channels so as to provide an amplitude modulation profile across the series of channels which is non-uniform, and wherein the series of waveguiding channels incorporates a gain medium.

42. A device according to claim 41 wherein the device includes an input channel for receiving an optical pump beam and a further input channel for receiving a signal conveying beam.

43. An arrayed waveguide grating device having a series of waveguiding channels (3) interconnecting two free propagation regions (2, 4) across which light inputting and outputting the device passes, there being differences in optical path length between any two of said channels lying adjacent to one other in said series which differences are defined by respective optical path length increments, wherein the optical path length progression across said channels is non-linear, such as to provide a non-linear phase profile across the channels.

44. An arrayed waveguide grating device having a series of waveguiding channels (3) interconnecting two free propagation regions (2, 4) across which light inputting and outputting the device passes, there being differences in optical path length between any two of said channels lying adjacent to one other in said series which differences are defined by respective optical path length increments, including means (6) operable to change the optical path length increments so that the optical path length increments can be made to follow an optical path length progression across said channels which is non-linear, such as to provide a non-linear phase profile across the channels.

45. A device according to claim 44 and comprising means operable to change the optical path length increments so that the optical path length increments can be made to successively increase from a minimum increment value, starting at one of said channels.

46. A device according to claim 45 wherein the starting channel is a channel at or close to the end of the series, whereby the optical path length increments successively increase across substantially all of the channels of the series, or successively decrease across substantially all of the channels of the series.

47. A device according to claim 45 wherein said starting channel is a channel at or close to the mid point of the series, whereby the optical path length increments successively increase towards both ends of the series or successively decrease towards both ends of the series.

48. A device according to claim 44, wherein said optical path length progression defined by a function of channel number in said series, counted from a starting channel, raised to the power of a factor P.

49. A device according to claim 48, wherein the M function is mod (m−M/2), where M is the total number of channels in the array.

50. A device according to claim 48, wherein the factor P=1.85 to 2.25.

51. A device according to claim 48, wherein the factor P is approximately two, to provide a parabolic progression of optical path length increment.

52. A device according to claim 49, wherein the non-linear phase profile $\phi$ is given by the function $$\phi = B[\mathrm{mod}(m-M/2)]^P$$

where
B is a function of the electrical control signal,
m is the channel number
M is the total number of channels
P is an exponent being a value not equal to 1.

53. A device according to claim 44, wherein the non-linear phase profile is given by the function $$m + Am + Bm^2$$

where m is the channel number.

54. A method of designing an arrayed waveguide device according to claim 53, the method comprising;
selecting a function defining a desired passband of the device;
finding a solution to a set of non-deterministic equations to find a phase deviation from a linear phase profile for each of a plurality of waveguiding channels of the device with which a passband at least approximating to the desired passband can be obtained; and
computing from the phase deviation the magnitude and sign of the optical path length increments for each of the channels of the series.

55. An arrayed waveguide grating device having a series of waveguiding channels (3) interconnecting two free propagation regions (2, 4) across which light inputting and outputting the device passes, there being differences in optical path length between any two of said channels lying adjacent to one other in said series which differences are defined by respective optical path length increments, further comprising means operable to change the optical path length increments so that the optical path length increments vary irregularly across the series of channels, to provide a varying phase profile without any significant amplitude modulation components, such as to give a desired spectral pass-band wherein the phase profile represents a hologram.

56. An arrayed waveguide grating device having a series of waveguiding channels (3) interconnecting two free propagation regions (2, 4) across which light inputting and outputting the device passes, there being differences in optical path length between any two of said channels lying adjacent to one other in said series which differences are defined by respective optical path length increments, further comprising means operable to change the optical path length increments so that the optical path length increments vary irregularly across the series of channels, to provide a varying phase profile without any significant amplitude modulation components, such as to give a desired spectral pass-band, wherein the values of the irregularly varying optical path length increments are such that the device has a passband which at least approximates to a function known, from one of signal theory and aperture theory, to provide filtering properties.

57. A device according to claim 56, wherein the filtering properties are one of passband broadening, passband equalization, passband segmentation into at least two passbands and wavelength-selective amplification/attenuation across the passband.

* * * * *